US012420297B2

(12) United States Patent
Suzuki

(10) Patent No.: US 12,420,297 B2
(45) Date of Patent: Sep. 23, 2025

(54) DUST SUPPRESSION SYSTEM

(71) Applicant: SUZUKEN KOGYO CO., LTD., Fuefuki (JP)

(72) Inventor: Yasunobu Suzuki, Fuefuki (JP)

(73) Assignee: SUZUKEN KOGYO CO., LTD., Fuefuki (JP)

( * ) Notice: Subject to any disclaimer, the term of this patent is extended or adjusted under 35 U.S.C. 154(b) by 1017 days.

(21) Appl. No.: 17/603,146

(22) PCT Filed: Jun. 23, 2020

(86) PCT No.: PCT/JP2020/024639
§ 371 (c)(1),
(2) Date: Oct. 12, 2021

(87) PCT Pub. No.: WO2020/262393
PCT Pub. Date: Dec. 30, 2020

(65) Prior Publication Data

US 2022/0193704 A1 Jun. 23, 2022

(30) Foreign Application Priority Data

Jun. 28, 2019 (JP) ................................ 2019-122468

(51) Int. Cl.
*B05B 7/10* (2006.01)
*E04G 23/08* (2006.01)

(52) U.S. Cl.
CPC ................ *B05B 7/10* (2013.01); *E04G 23/08* (2013.01)

(58) Field of Classification Search
None
See application file for complete search history.

(56) References Cited

U.S. PATENT DOCUMENTS 2,986,344 A * 5/1961 Wheeler ............. F16L 27/0812 285/280
5,249,632 A * 10/1993 Sparling ............... B05B 15/654 239/275
2010/0236799 A1* 9/2010 Vetesnik .................. A62C 5/02 169/70

FOREIGN PATENT DOCUMENTS

JP H06-280403 A 10/1994
JP 2015-227568 A 12/2015

OTHER PUBLICATIONS

"Notice of Reasons for Refusal" mailed May 9, 2023 for foreign equivalent Japanese Patent Application No. 2019-122468.*

(Continued)

*Primary Examiner* — Charles Capozzi
(74) *Attorney, Agent, or Firm* — Oliff PLC

(57) ABSTRACT

A dust suppression system has one or more fluid dischargers configured to discharge a fluid capable of suppressing generation of dust to a work area of a building by remote operation. The fluid discharger includes a discharge nozzle configured to discharge the fluid; a first swivel joint structure including a first rotating-side body connected to and supporting the discharge nozzle and a first fixed-side body rotatably supporting the first rotating-side body; a first electric linear motion mechanism including a first support part and a first movable part supported by the first support part in a linearly movable manner; and a first rotation mechanism configured to convert linear motion of the first movable part into rotational motion to rotationally displace the first rotating-side body. The dust suppression system can further reduce power consumption as well as can accurately discharge a fluid from a fluid discharger to a predetermined work area.

14 Claims, 12 Drawing Sheets

(56) References Cited

OTHER PUBLICATIONS

Sep. 8, 2020 International Search Report issued in International Patent Application No. PCT/JP2020/024639.

* cited by examiner

DUST SUPPRESSION SYSTEM

TECHNICAL FIELD

The present invention relates to a dust suppression system.

BACKGROUND ART

Due to the nature of civil engineering work, construction work, demolition work, and the like, dust and the like (hereinafter, simply referred to as "dust") is often generated at work sites. Particularly in demolition work of (all or part of) buildings (objects to be demolished), generation of dust at work sites is unavoidable. If measures against dust are not taken, not only will working environments deteriorate, but also the dust will be scattered in surrounding areas, causing discomfort to residents living near the site, and in some cases, leading to health hazards. Therefore, various measures have been devised to control dust dispersion during demolition work.

For example, a dust suppression system with a fluid discharger disclosed in Patent Literature 1, in particular, controls the direction of a discharge nozzle of the fluid discharger with two rotation devices by remote operation, and controls, with an open/close valve, the amount of fluid to be discharged, so that the fluid is discharged efficiently and accurately to a work area at a work site.

Therefore, the use of the fluid discharger according to Patent Literature 1 can eliminate the need for a worker who sprays water to suppress the scattering of dust associated with demolition work.

In other words, since there can be no need to place such a worker in the vicinity of a work machine performing demolition work, it is possible to limit the exposure of the worker to dust, and make a work environment safer for workers while saving water at work sites.

CITATION LIST

Patent Literature

Patent Literature 1: Japanese Patent Application Laid-Open No. 2015-227568

SUMMARY OF INVENTION

Technical Problem

In the fluid discharger disclosed in Patent Literature 1, piping connected to the discharge nozzle can be bent, which enables the discharge nozzle to be rotated and tilted. However, conversely, in a case in which a pressure condition of the fluid in the piping changes, a load on the rotation devices for controlling the direction of the discharge nozzle greatly fluctuates. In other words, the fluid discharger disclosed in Patent Literature 1 requires output of the rotation devices to be kept at a reasonable level in anticipation of fluctuations in load. Therefore, there is a possibility of the configuration of the fluid discharger described in Patent Literature 1 not being able to sufficiently respond to further demands for lower power consumption.

The present invention was made to solve the above-mentioned problem, and an object of the present invention is to provide a dust suppression system that can further reduce power consumption as well as accurately discharge a fluid from a fluid discharger to a predetermined work area.

Solution to Problem

To solve the above-described problem, the present invention is a dust suppression system including one or more fluid dischargers configured to discharge a fluid capable of suppressing generation of dust to a work area of an object to be worked by remote operation, the fluid discharger including a discharge nozzle configured to discharge the fluid; a first swivel joint structure including a first rotating-side body connected to and supporting the discharge nozzle and a first fixed-side body rotatably supporting the first rotating-side body; a first electric linear motion mechanism including a first support part and a first movable part supported by the first support part in a linearly movable manner; and a first rotation mechanism configured to convert linear motion of the first movable part into rotational motion to rotationally displace the first rotating-side body wherein, pressure fluctuation of the fluid is applied in the direction of the rotational axis of the first rotating-side body.

In the present invention, the first rotation mechanism converts linear motion of the first movable part into rotational motion to rotationally displace the first rotating-side body. That is, since pressure fluctuation of the fluid is applied in the direction of the rotational axis of the first rotating-side body, the effect of the pressure fluctuation is insubstantial around the rotational axis of the first swivel joint structure. Therefore, it is possible to minimize a tolerance range necessary to cope with the pressure fluctuation of the fluid for output of the first electric linear motion mechanism, which rotates the first rotating-side body. Also, since the first electric linear motion mechanism rotates the discharge nozzle, it is not necessary to install a separate limit switch to limit the direction of the discharge nozzle as in the case of a rotation device, thus achieving cost reduction.

In a case in which the first rotating-side body is provided with a first lever, and the first rotation mechanism includes a first connection part that connects the first movable part and the first lever, the first rotation mechanism can have a simple configuration, thus achieving reduction in size and cost.

The fluid discharger further includes: a support member; a rotation member that supports the discharge nozzle, the first electric linear motion mechanism, the first rotation mechanism, and a second electric linear motion mechanism including a second support part and a second movable part supported by the second support part in a linearly movable manner, the rotation member being rotatable with respect to a support shaft of the support member; and a second rotation mechanism configured to convert linear motion of the second movable part into rotational motion to rotationally move the rotation member with respect to the support member, wherein the support shaft is orthogonal to a rotational axis of the first swivel joint structure. In this case, it is possible to control the discharge nozzle with respect to the support member in two directions. Also, since the rotation member is rotated by the second electric linear motion mechanism, a separate limit switch for limiting the range of the rotation member does not have to be provided, which enables cost reduction.

In a case in which the second rotation mechanism includes a first external gear that is provided at an end of the second movable part and has a spiral shape along a movement direction of the second movable part; and a second external gear that has an opening shape on its central axis that engages with the first external gear, rotates with linear motion of the first external gear, and engages with a fixed gear fixed to the support shaft, the second movable part can move in the same direction as the rotational axis of the rotation member, which can facilitate assembly.

In a case in which the support shaft is provided with a second lever, and the second rotation mechanism includes a second connection part that connects the second movable part and the second lever, the second rotation mechanism can have a simple configuration, thus achieving reduction in size and cost.

In a case in which the second rotation mechanism includes a base member attached to the second movable part, a string-like member held at a predetermined tension along the movement direction of the second movable part on the base member, and a pulley that has a groove provided on an outer circumference engaging with the string-like member and is fixed to the support shaft, it is possible to make constant a rotational torque of the rotation member by the second rotation mechanism, and increase the rotational amount of the rotation member, which can be realized by the second rotation mechanism.

In a case in which the string-like member is arranged around an entire circumference of the groove and is in the form of crossing, the string-like member is wound around the entire circumference of the pulley, so that the pulley can be relatively rotated more reliably by moving the base member.

In a case in which the fluid discharger includes a second swivel joint structure that has a second rotating-side body supported by the rotation member and connected to and supporting the first swivel joint structure, and a second fixed-side body disposed on the support shaft and rotatably supporting the second rotating-side body, pressure fluctuation of the fluid is applied in the direction of the rotational axis of the second rotating-side body, so that the effect of the pressure fluctuation is insubstantial around the rotational axis of the second swivel joint structure. Therefore, it is possible to minimize a tolerance range necessary to cope with the pressure fluctuation of the fluid for output of the second electric linear motion mechanism, which rotates the second rotating-side body.

In a case in which the fluid discharger further includes a third electric linear motion mechanism that has a third support part and a third movable part supported by the third support part in a linearly movable manner; and a third rotation mechanism configured to convert linear motion of the third movable part into rotational motion to open and close an open/close valve to regulate the amount of the fluid to be discharged from the discharge nozzle, the individual fluid discharger can control discharge and blockage of the fluid.

In a case in which an open/close shaft of the open/close valve is provided with a third lever, and the third rotation mechanism includes a third connection part configured to connect the third movable part and the third lever, the third rotation mechanism can have a simple configuration, and axis alignment with the open/close shaft can be easily performed. That is, it is possible to achieve reduction in size and cost.

In a case in which the third electric linear motion mechanism, the third rotation mechanism, and the open/close valve are supported by the rotation member, the number of components directly supported by the support member can be reduced, and the support member can be easily replaced. Also, it is also possible to efficiently arrange the first electric linear motion mechanism, the second electric linear motion mechanism, and the third electric linear motion mechanism in the rotation member, which further promotes downsizing and weight reduction.

In a case in which an end of the first support part, an end of the second support part, and an end of the third support part are rotatably axially supported, it is possible to easily attach the first electric linear motion mechanism, the second electric linear motion mechanism, and the third electric linear motion mechanism.

In a case in which the first electric linear motion mechanism, the second electric linear motion mechanism, and the third electric linear motion mechanism are disposed in the same direction in the rotation member, the first electric linear motion mechanism, the second electric linear motion mechanism, and the third electric linear motion mechanism can collectively respond to factors of performance degradation due to external environmental changes. For example, moisture capable of entering into the first electric linear motion mechanism, the second electric linear motion mechanism, and the third electric linear motion mechanism can be effectively cut off. Also, greater miniaturization and weight reduction can be promoted.

In a case in which the fluid includes water or a foamy material, scattering of dust can be effectively reduced.

In a case in which the remote operation is made from one transmitter to a plurality of the fluid dischargers, the number of operators of the fluid dischargers can be minimized and the plurality of fluid dischargers can be used efficiently.

Advantageous Effects of Invention

According to the present invention, it is possible to further reduce power consumption, as well as accurately discharge a fluid from a fluid discharger to a predetermined work area.

DESCRIPTION OF EMBODIMENTS

An example of a first embodiment of the present invention will be hereinafter described in detail with reference to the drawings.

First, a work site where a dust suppression system according to the present embodiment is used will be described.

Figure 1:
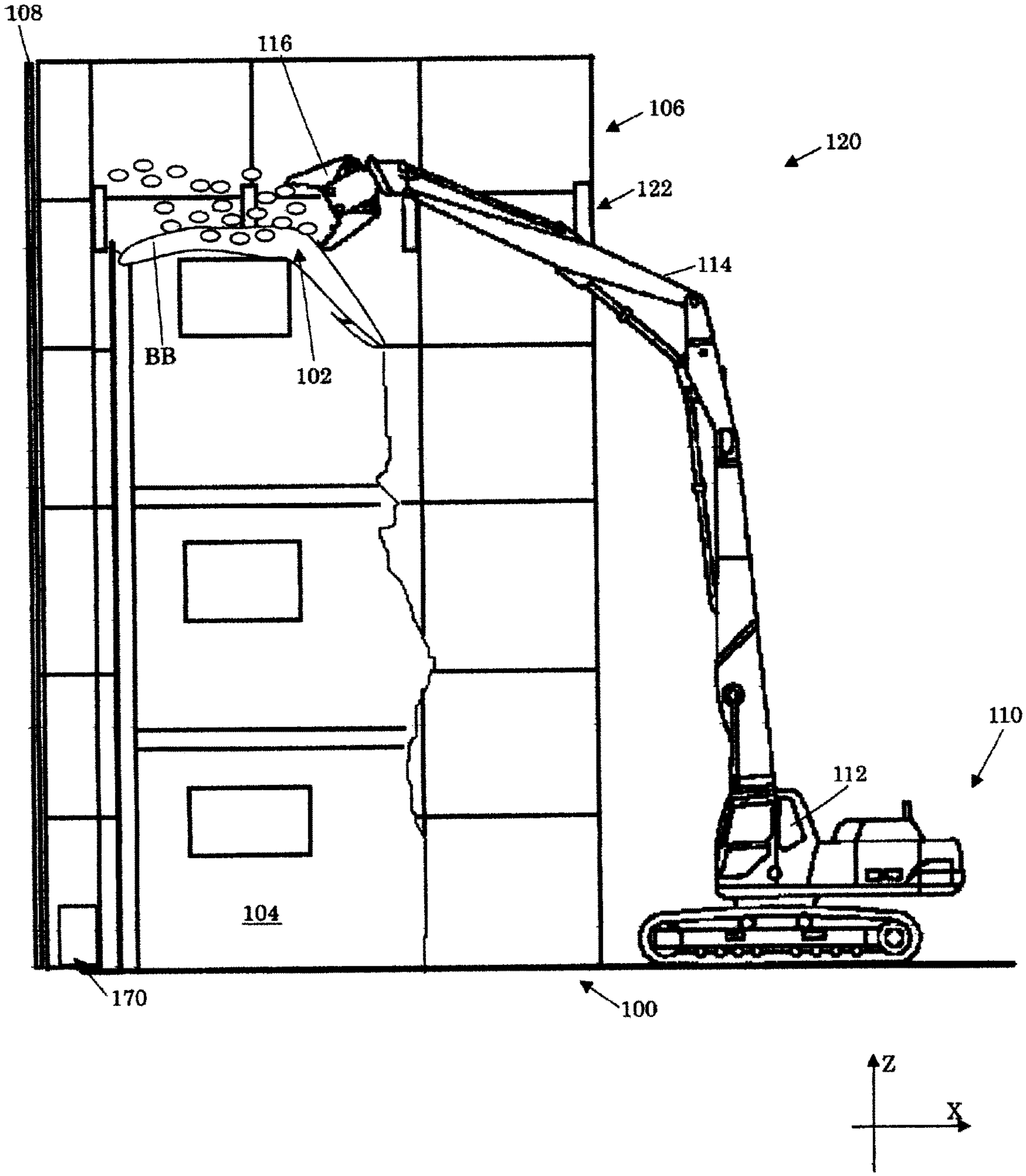
FIG. 1 is a side view illustrating an example of a dust suppression system according to a first embodiment of the present invention used at a work site.

As illustrated in FIG. 1, scaffolding 106 is built around a work site 100, and a curing sheet 108 is attached to the outside of the scaffolding 106. A building 104, which is an object to be worked on, is located at the work site 100 inside the scaffolding 106. In the building 104, a work area 102, which is a part (encircled part) covered with a fluid BB sprayed from a fluid discharger 122 of a dust suppression system 120 to be described later, is demolished by a work machine 110. The work machine 110 can move freely in any direction, for example, by crawler tracks. The work machine 110 is provided with a cab 112. From the cab 112, a work attachment 116 at an end of an arm 114 and the crawler tracks can be freely operated (by a worker or by a remotely operated robot in the cab 112). In the present embodiment, the work attachment 116 is a crushing tool, and the work machine 110 is a so-called "crusher." The fluid discharger 122 can be remotely operated by a transmitter (not illustrated) brought into the cab 112 (the transmitter may be operated from outside the cab). The work area 102 includes an area where the work attachment 116 comes into direct contact with the building 104 and where dust is directly generated by demolition with the work attachment 116. The fluid BB may be water or any flowable foamy material including air bubbles.

Next, the schematic configuration of the dust suppression system 120 according to the present invention will be described.

Figure 2A:
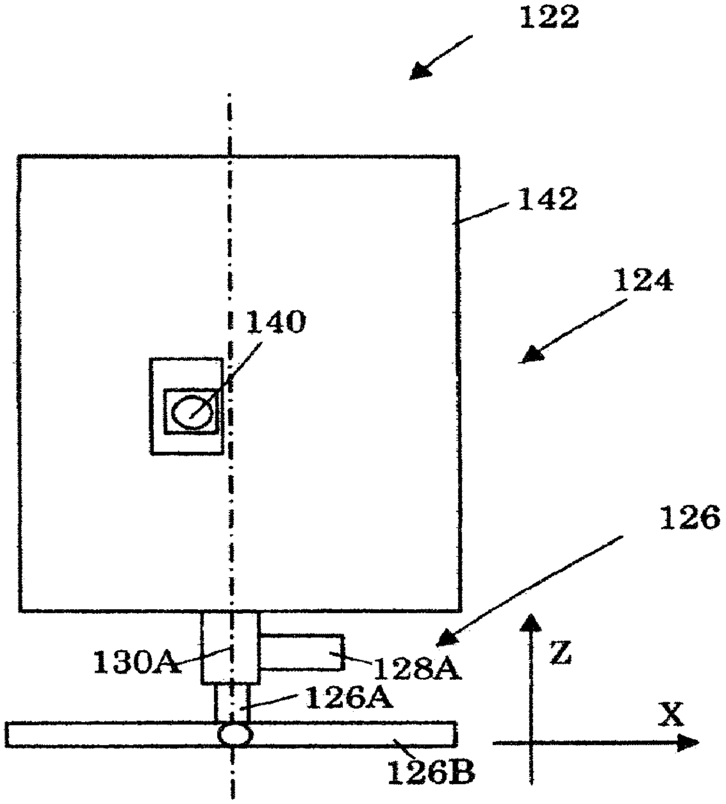
FIG. 2A is a front view of a fluid discharger of the dust suppression system in FIG. 1.
Figure 2B:
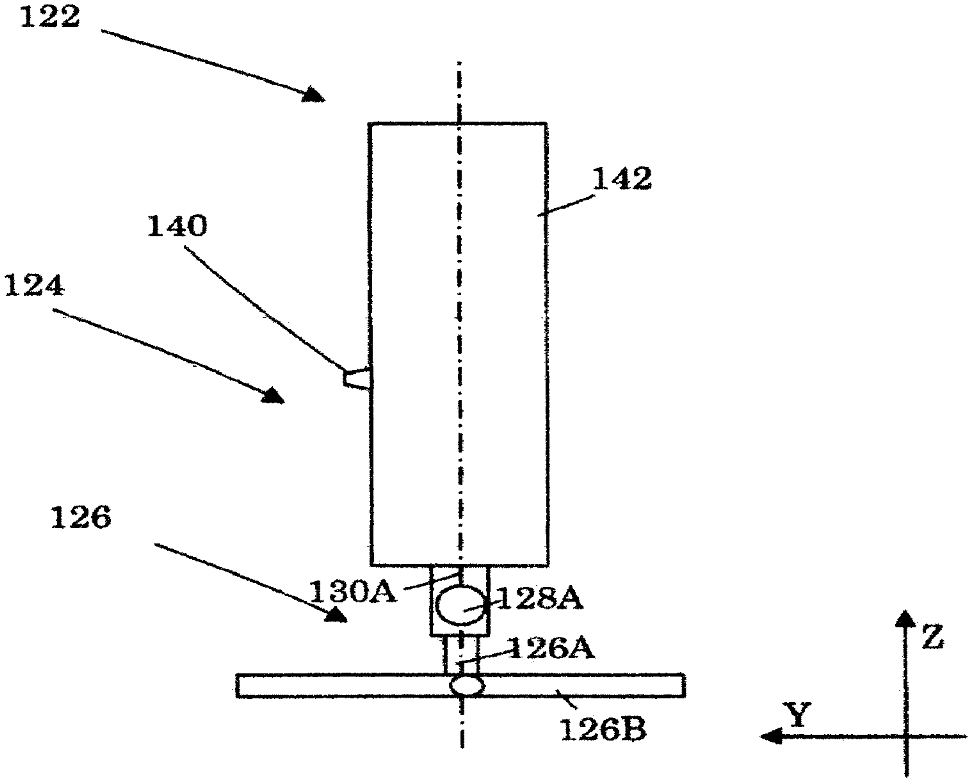
FIG. 2B is a side view of the fluid discharger in FIG. 2A.
Figure 2C:
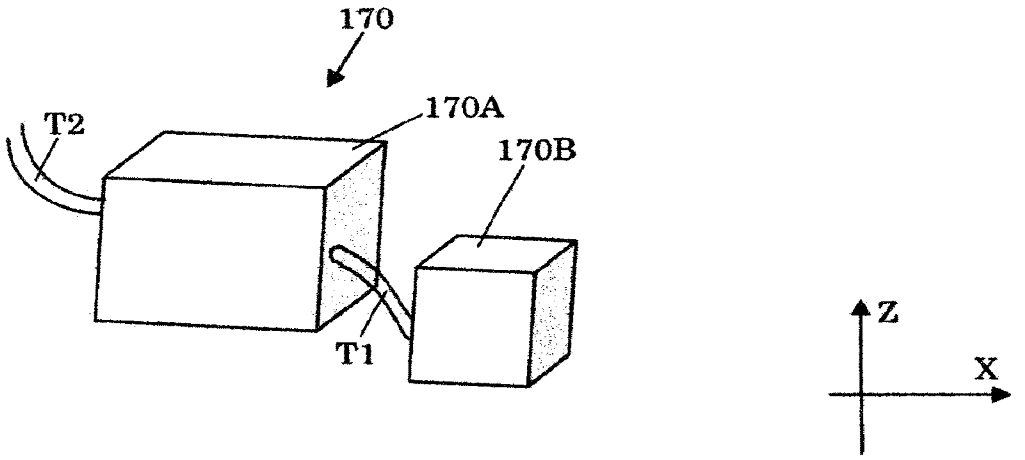
FIG. 2C is a schematic diagram of a pressure feeding mechanism of the dust suppression system in FIG. 1.
Figure 3A:
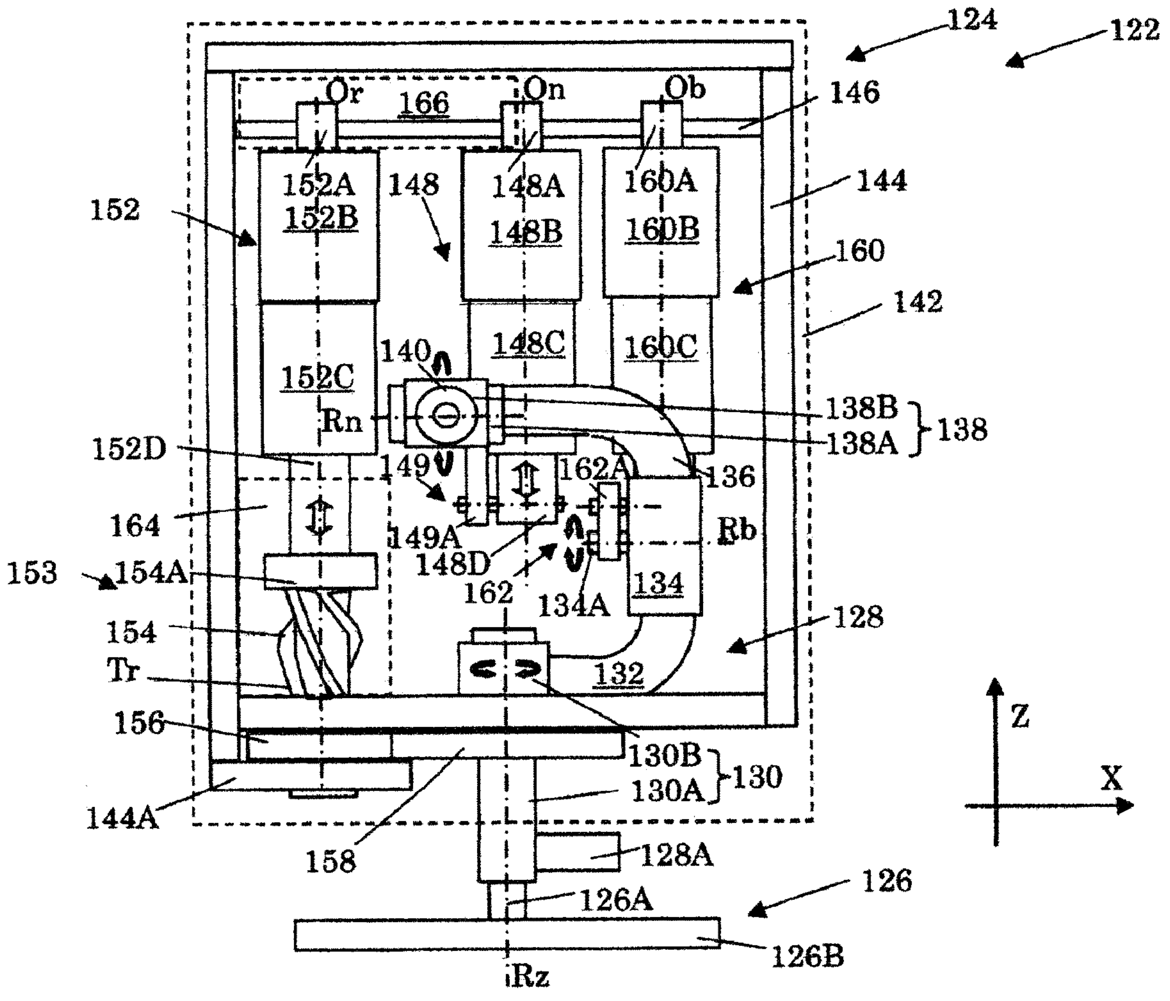
FIG. 3A is a front view of the fluid discharger in FIG. 2A in which a casing and the like are made transparent.
Figure 3B:
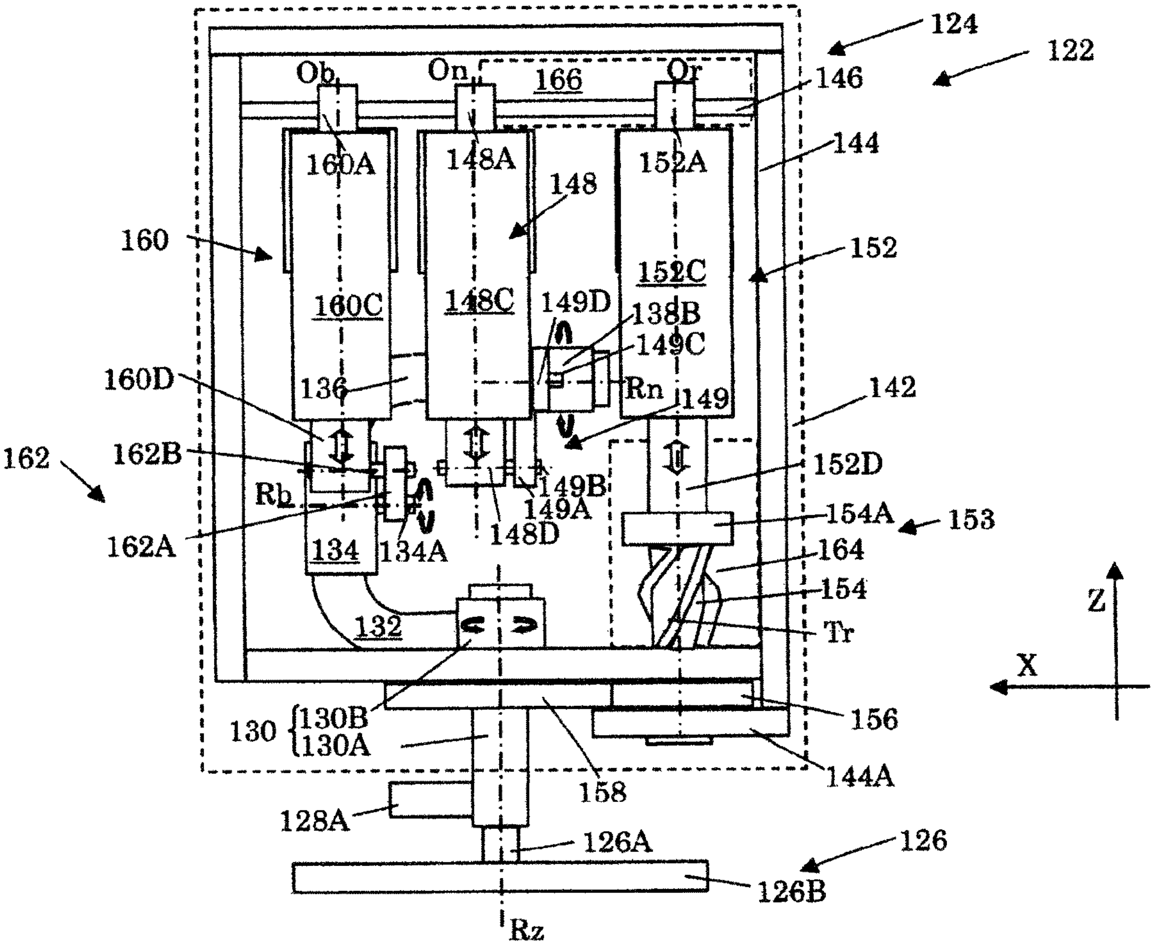
FIG. 3B is a rear view of FIG. 3A in which the casing and the like are made transparent.

As illustrated in FIG. 1, the dust suppression system 120 has one or more fluid dischargers 122 and a pressure feeding mechanism 170. The fluid discharger 122 is remotely operated to discharge a fluid BB that can suppress generation of dust to the work area 102 of the building 104. As illustrated in FIGS. 3A and 3B, for example, the fluid discharger 122 has a discharge nozzle 140, a first swivel joint structure 138, a first electric linear motion mechanism 148, and a first rotation mechanism 149. The discharge nozzle 140 discharges the fluid BB. The first swivel joint structure 138 has a first rotating-side body 138B connected to and supporting the discharge nozzle 140, and a first fixed-side body 138A rotatably supporting the first rotating-side body 138B. The first electric linear motion mechanism 148 has a first support part 148C and a first movable part 148D that is supported by the first support part 148C in a linearly movable manner. The first rotation mechanism 149 converts linear motion of the first movable part 148D into rotational motion to rotationally displace the first rotating-side body 138B. As illustrated in FIG. 2C, the pressure feeding mechanism 170 forcibly feeds high-pressure water or a foamy component to the fluid discharger 122. The pressure feeding mechanism 170 is equipped with a tank 170B configured to store the water or foamy component, and a pump 170A configured to compress the water or foamy component. The tank 170B and the pump 170A, and the pump 170A and the fluid discharger 122 are connected by flexible pipes T1 and T2 made of a resin, respectively.

The not-illustrated transmitter, which remotely operates the fluid discharger 122, is made in a portable shape so that the direction of the discharge nozzle 140 configured to discharge the fluid BB can be changed in vertical and horizontal directions, and the amount of the fluid BB to be discharged can be controlled. In the present embodiment, one transmitter can remotely operate up to 16 fluid dischargers 122.

Each component will be described below in detail.

As illustrated in FIGS. 3A and 3B, the fluid discharger 122 includes a flow channel component 128, a support member 126, a rotation member 124, and a second rotation mechanism 153.

As illustrated in FIGS. 3A and 3B, the flow channel component 128 includes a fluid inlet port 128A, a second swivel joint structure 130, L-shaped pipes 132 and 136, an open/close valve 134, the first swivel joint structure 138, and the discharge nozzle 140. From the fluid inlet port 128A, the fluid BB forcibly fed from the pressure feeding mechanism 170 is introduced via the flexible pipe T2. The second swivel joint structure 130 has a second fixed-side body 130A fixed on a support shaft 126A of the support member 126, and a second rotating-side body 130B fixed to the rotation member 124 and rotatable around the central axis (rotational axis Rz) of the second fixed-side body 130A (i.e., among the flow channel component 128, the fluid inlet port 128A and the second fixed-side body 130A are supported by the support member 126, and the second rotating-side body 130B, the L-shaped pipes 132 and 136, the open/close valve 134, the first swivel joint structure 138, and the discharge nozzle 140 are supported by and fixed to the rotation member 124). The L-shaped pipes 132 and 136 are pipes made of L-shaped steel, and the L-shaped pipe 132 is connected to the second rotating-side body 130B and the open/close valve 134. The open/close valve 134 is, for example, a ball valve, and controls the amount of the fluid BB to be discharged by rotating an open/close shaft 134A (around rotational axis Rb). The L-shaped pipe 136 is connected to the open/close valve 134 and the first swivel joint structure 138 (i.e., the fluid discharger 122 is configured to include the second swivel joint structure 130, which has the second rotating-side body 130B, which is supported by the rotation member 124 and connected to the first swivel joint structure 138 to support the first swivel joint structure 138, and the second fixed-side body 130A, which is disposed on the support shaft 126A and rotatably supports the second rotating-side body 130B). The first swivel joint structure 138 includes the first fixed-side body 138A connected to the L-shaped pipe 136, and the first rotating-side body 138B rotatable around the central axis (rotational axis Rn) of the first fixed-side body 138A. The discharge nozzle 140 is attached to the first rotating-side body 138B. Therefore, the central axis (rotational axis Rz) of the support shaft 126A and the rotational axis Rn of the first swivel joint structure 138 are configured to be orthogonal to each other.

As illustrated in FIGS. 3A and 3B, the support member 126 includes a base 126B constituted of iron rods assembled radially, and the support shaft 126A supporting the rotation member 124 via the second swivel joint structure 130.

As illustrated in FIGS. 3A and 3B, the rotation member 124 is rotatable with respect to the support shaft 126A of the support member 126. As illustrated in FIGS. 2A and 2B, a rectangular parallelepiped casing 142 is attached to the rotation member 124 (indicated by dashed lines in FIGS. 3A and 3B) (not limited to this, a cylindrical casing or the like may be adopted). The rotation member 124 supports the discharge nozzle 140, the first electric linear motion mechanism 148, the first rotation mechanism 149, a second electric linear motion mechanism 152, a third electric linear motion mechanism 160, a third rotation mechanism 162, a control device 164, and a power supply 166 inside a frame body 144 made of plate steel in a frame shape.

As illustrated in FIGS. 3A and 3B, the first, second, and third electric linear motion mechanisms 148, 152, and 160 include mount parts 148A, 152A, and 160A, motor parts 148B, 152B, and 160B, first, second, and third support parts 148C, 152C, and 160C, and first, second, and third movable parts 148D, 152D, 160D, respectively. The mount parts 148A, 152A, and 160A have not-illustrated through holes, and are provided at ends of the first, second, and third support parts 148C, 152C, and 160C, respectively. This allows the first, second, and third electric linear motion mechanisms 148, 152, and 160 to be axially supported by a single support rod 146 attached to the frame body 144. In other words, due to the simple configuration of the single support rod 146, the end of the first support part 148C, the end of the second support part 152C, and the end of the third support part 160C are configured to be rotatably axially supported. Also, the first electric linear motion mechanism 148, the second electric linear motion mechanism 152, and the third electric linear motion mechanism 160 are all configured to be disposed in the same direction inside the rotation member 124.

The motor parts 148B, 152B, and 160B contain, for example, electric motors. The first, second, and third support parts 148C, 152C, and 160C contain ball screws, for example, and rotation of the electric motors are converted into rotation of the ball screws. The first, second, and third movable parts 148D, 152D, and 160D are linearly movable in the directions of movement axes On, Or and Ob, respectively, by the rotation of the ball screws.

Figure 4A:
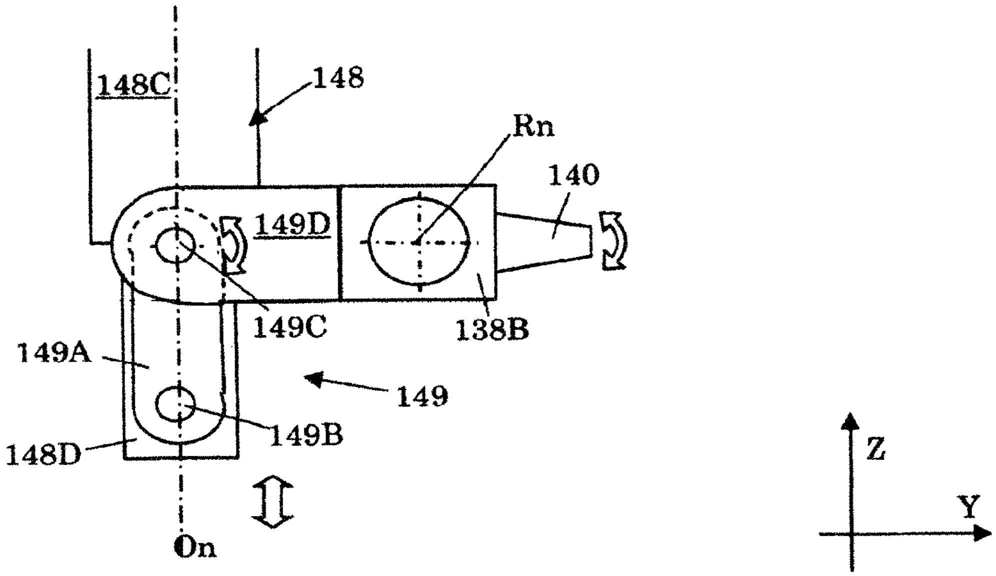
FIG. 4A is a detailed configuration diagram of the fluid discharger in FIG. 2A, illustrating a configuration around a discharge nozzle as a side view.

As illustrated in FIG. 4A, the first rotation mechanism 149 has a plate-like first connection part 149A between the first movable part 148D and a first lever 149D provided on the first rotating-side body 138B of the first swivel joint structure 138, in addition, the first connection part 149A is connected to the first movable part 148D and the first lever 149Dbypins 149B and 149C, respectively. In other words, the first rotating-side body 138B is provided with the first lever 149D, and the first rotation mechanism 149 is configured to include the first connection part 149A connecting the first movable part 148D and the first lever 149D.

Figure 4B:
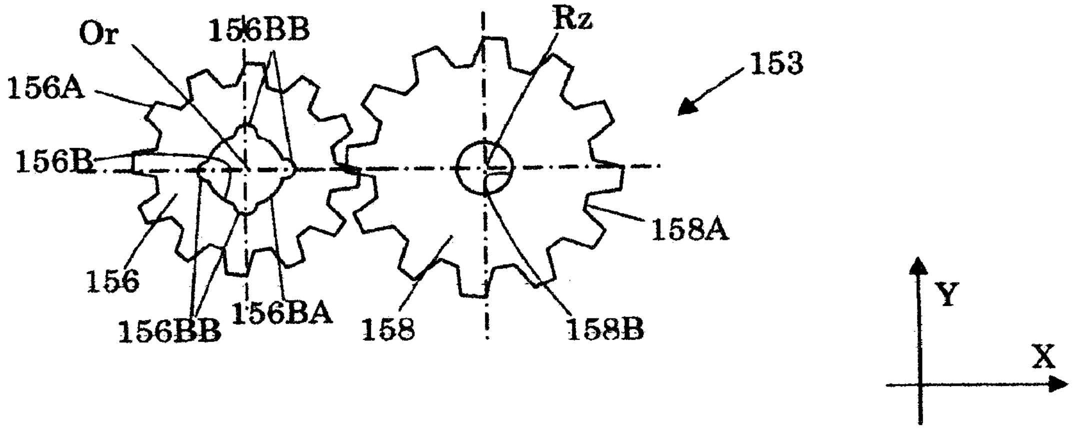
FIG. 4B is a detailed configuration diagram of the fluid discharger in FIG. 2A, illustrating first and second external gears configured to rotate a rotation member as a bottom view.
Figure 4C:
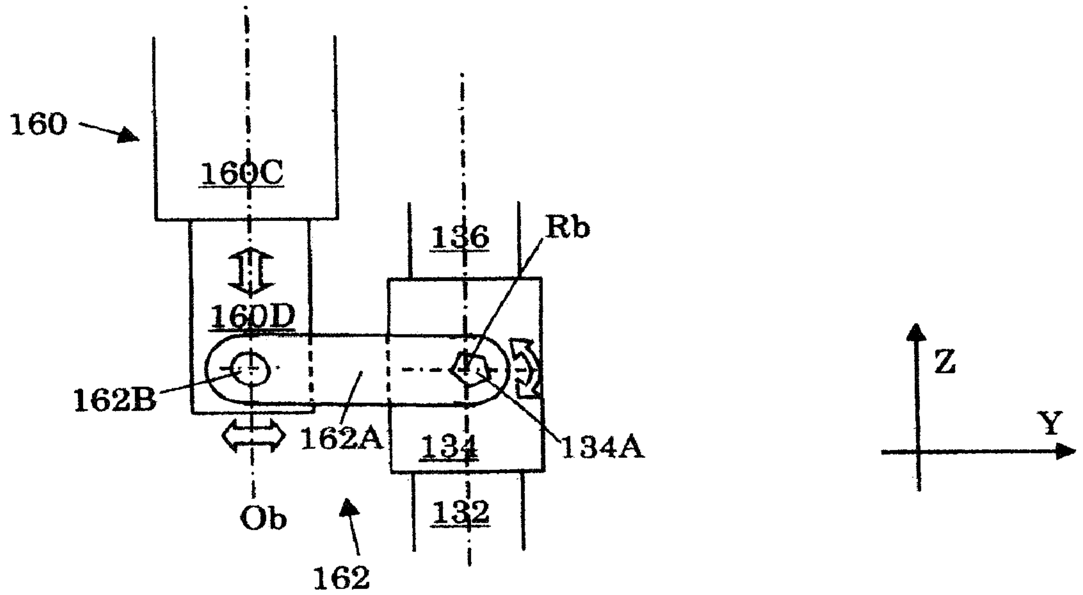
FIG. 4C is a detailed configuration view of the fluid discharger in FIG. 2A, illustrating a configuration around an open/close valve as a side view.

As illustrated in FIG. 4C, the third rotation mechanism 162 converts linear motion of the third movable part 160D into rotational motion to open and close the open/close valve 134, which regulates the amount of the fluid BB to be discharged from the discharge nozzle 140. Specifically, the third rotation mechanism 162 is configured so that a third lever 162A provided on the open/close shaft 134A of the open/close valve 134 and the third movable part 160D are connected by a pin 162B. That is, in the present embodiment, the third lever 162A is provided on the open/close shaft 134A of the open/close valve 134, and the third rotation mechanism 162 is configured to include the pin 162B (third connection part) that connects the third movable part 160D and the third lever 162A. As a result, by motion of the third movable part 160D, the movement axis Ob swingingly rotates around the support rod 146.

In FIGS. 3A and 3B, the control device 164 and the power supply 166 are indicated by dashed lines. The control device 164 is equipped with a wireless unit, a processing unit, and a driving unit. The wireless unit receives a signal from the not-illustrated transmitter. The processing unit controls the wireless unit, and decodes the signal received by the wireless unit and outputs the decoded signal as a control signal to the driving unit. The driving unit drives and controls the first, second, and third electric linear motion mechanisms 148, 152, and 160 with a drive signal corresponding to the control signal. The power supply 166 is, for example, a rechargeable battery (maybe a power adapter that converts an external power supply into a DC power supply), and supplies all the power to be used by the fluid discharger 122.

As illustrated in FIGS. 3A, 3B, and 4B, the second rotation mechanism 153 is configured to convert linear motion of the second movable part 152D into rotational motion to rotationally move the rotation member 124 relative to the support member 126. Specifically, the first rotation mechanism 149 includes a first external gear 154, a second external gear 156, and a fixed gear 158. The first external gear 154 is provided at an end of the second movable part 152D via amount part 154A. The first external gear 154 has a spiral shape along the movement direction (movement axis Or) of the second movable part 152D. Here, the second external gear 156 is configured to have an opening shape on its center axis which engages with the first external gear 154, and rotates with the linear motion of the first external gear 154. In other words, as illustrated in FIG. 4B, the cross section of the outer shape of the first external gear 154 is basically a circle (shape corresponding to an inner surface 156BA of an opening shape 156B). The first external gear 154 is provided with four symmetrical arc-shaped teeth (teeth corresponding to inner surfaces 156BB) on its outer periphery (not limited to this, maybe two or more arc-shaped teeth, or teeth of another shape instead of arc shape). Furthermore, as illustrated in FIGS. 3A and 3B, the angle between a spiral trajectory Tr of the four arc-shaped teeth and the movement axis Or is desirably an acute angle (45 degrees or less). The spiral trajectory Tr of the four arc-shaped teeth is, at most, 360 degrees or less (rotation angle of 360 degrees or less) around the movement axis Or in a movable range of the second movable part 152D. The opening shape of the second external gear 156 is provided at the central axis and is formed slightly larger than the outer shape of the first external gear 154 so that the first external gear 154 can slide along the movement axis Or. The second external gear 156 is a spur gear, and the second external gear

156 engages with the fixed gear 158 fixed to the support shaft 126A. In other words, the fixed gear 158 is also a spur gear. The reference numeral 144A indicates a holder part 144A provided on the frame body 144 to stabilize the position of the second external gear 156 in a rotatable manner.

Thus, in the present embodiment, the first rotation mechanism 149 converts linear motion of the first movable part 148D into rotational motion to rotationally displace the first rotating-side body 138B. That is, since pressure fluctuation of the fluid BB is applied in the direction of the rotational axis Rn of the first rotating-side body 138B, the effect of the pressure fluctuation is insubstantial around the rotational axis Rn of the first swivel joint structure 138. Therefore, it is possible to minimize a tolerance range necessary to cope with the pressure fluctuation of the fluid BB for output of the first electric linear motion mechanism 148. Also, since the first electric linear motion mechanism 148 rotates the discharge nozzle 140, it is not necessary to install a separate limit switch to limit the direction of the discharge nozzle 140 as in the case of a rotation device, thus achieving cost reduction.

In the present embodiment, the first rotating-side body 138B is provided with the first lever 149D, and the first rotation mechanism 149 includes the first connection part 149A that connects the first movable part 148D and the first lever 149D. As a result, the first rotation mechanism 149 can have a simple configuration, thus achieving reduction in size and cost. Not limited to this, another such configuration may be adopted, for example, the first rotation mechanism may be configured using a rack and pinion.

Furthermore, in the present embodiment, the fluid discharger 122 includes: the support member 126; the rotation member 124 that supports the discharge nozzle 140, the first electric linear motion mechanism 148, the first rotation mechanism 149, and the second electric linear motion mechanism 152 and is rotatable with respect to the support shaft 126A of the support member 126; and the second rotation mechanism 153 that rotationally moves the rotation member 124 with respect to the support member 126, additionally, the support shaft 126A is orthogonal to the rotational axis of the first swivel joint structure 138. Therefore, it is possible to control the discharge nozzle 140 with respect to the support member 126 in two directions. Also, since the rotation member 124 is rotated by the second electric linear motion mechanism 152, a separate limit switch for limiting the range of the rotation member 124 does not have to be provided, allowing cost reduction. Not limited to this, for example, there can be no second electric linear motion mechanism and the rotation member does not have to rotate with respect to the support member.

In the present embodiment, the second rotation mechanism 153 includes the first external gear 154 and the second external gear 156 that has the opening shape 156B on its central axis that engages with the first external gear 154, rotates with linear motion of the first external gear 154, and engages with the fixed gear 158 fixed to the support shaft 126A. As a result, the direction of the movement axis Or of the second movable part 152D can be the same direction as the rotational axis (rotational axis Rz) of the rotation member 124, which can facilitate assembly.

Also, in the present embodiment, the fluid discharger 122 is provided with the second swivel joint structure 130 with the second rotating-side body 130B supported by the rotation member 124 and the second fixed-side body 130A disposed on the support shaft 126A. Therefore, the pressure fluctuation of the fluid BB is applied in the direction of the rotational axis Rz of the second rotating-side body 130B, and the effect of the pressure fluctuation is insubstantial around the rotational axis Rz of the second swivel joint structure 130. Therefore, it is possible to minimize a tolerance range necessary to cope with the pressure fluctuation of the fluid BB for output of the second electric linear motion mechanism 152, which rotates the second rotating-side body 130B.

In the present embodiment, the fluid discharger 122 is further provided with the third electric linear motion mechanism 160 and the third rotation mechanism 162 that opens and closes the open/close valve 134 to regulate the amount of the fluid BB to be discharged from the discharge nozzle 140. Thus, even in a case in which a plurality of fluid dischargers 122 are connected to the single pressure feeding mechanism 170, each of the fluid dischargers 122 can control discharge and blockage of the fluid BB. Alternatively, the amount of the fluid BB to be discharged can be controlled by the individual fluid dischargers 122, without the necessity of having to control the amount of the fluid BB to be discharged while the pressure feeding mechanism 170 is still feeding the fluid BB forcibly. Not limited to this, the open/close valve may not be provided, or even in a case in which there is an open/close valve, the open/close valve may not be controlled by the third electric linear motion mechanism.

In the present embodiment, the open/close shaft 134A of the open/close valve 134 is provided with the third lever 162A, and the third rotation mechanism 162 is provided with the pin 162B connecting the third movable part 160D and the third lever 162A.

As a result, the third rotation mechanism 162 can have a simple configuration and axis alignment with the open/close shaft 134A can be easily performed. In other words, downsizing and cost reduction are possible. Not limited to this, the third rotation mechanism may be configured in other ways, for example, with a rack and pinion.

In the present embodiment, the third electric linear motion mechanism 160, the third rotation mechanism 162, and the open/close valve 134 are supported by the rotation member 124. For this reason, the number of components directly supported by the support member 126 can be reduced, and the support member 126 can be easily replaced. Also, it is also possible to efficiently arrange the first electric linear motion mechanism 148, the second electric linear motion mechanism 152, and the third electric linear motion mechanism 160 in the rotation member 124, which further promotes downsizing and weight reduction. Not limited to this, at least any one of the third electric linear motion mechanism, the third rotation mechanism, and the open/close valve may be supported by the support member. In such a case, the weight of the component supported by the support member can lower the overall center of gravity, and hence make the fluid discharger less likely to fall over.

In the present embodiment, the end of the first support part 148C, the end of the second support part 152C, and the end of the third support part 160C are rotatably axially supported. This makes it easy to attach the first electric linear motion mechanism 148, the second electric linear motion mechanism 152, and the third electric linear motion mechanism 160. Not limited to this, only any one of the end of the first support part, the end of the second support part, and the end of the third support part may be axially supported, or none of them may be axially supported.

In the present embodiment, the first electric linear motion mechanism 148, the second electric linear motion mechanism 152, and the third electric linear motion mechanism

160 are disposed in the same direction in the rotation member 124. Therefore, the first electric linear motion mechanism 148, the second electric linear motion mechanism 152, and the third electric linear motion mechanism 160 can collectively respond to factors of performance degradation due to external environmental changes. Specifically, gaps between the first movable part 148D and the first support part 148C, between the second movable part 152D and the second support part 152C, and between the third movable part 160D and the third support part 160C can be directed in the same direction, and moisture capable of entering from the gaps into the first electric linear motion mechanism 148, the second electric linear motion mechanism 152, and the third electric linear motion mechanism 160 can be effectively cut off. In the present embodiment, since the first, second, and third support parts 148C, 152C and 160C are disposed above in the Z-direction and the first, second, and third movable parts 148D, 152D and 160D are disposed below, moisture can be effectively prevented from entering without taking any special measures. Also, greater miniaturization and weight reduction can be promoted. Not limited to this, the first, second, and third movable parts may be disposed above the first, second, and third support parts. In this case, the same measures can be taken for all mechanisms at once, which is more efficient. Of course, any of the first, second, and third electric linear motion mechanisms maybe disposed in a different direction within the rotation member.

Also, in the present embodiment, the fluid BB includes water or a foamy material. Therefore, in a case in which the fluid BB is water, the scattering of dust can be effectively reduced, the fluid BB can be discharged in a wider range, and the configuration of the fluid discharger 122 can be simplified as compared to a case in which the fluid BB is a foamy material. In a case in which the fluid BB is a foamy material, the scattering of dust can be effectively reduced, the amount of water used can be greatly reduced, and not only dust but also odor can be effectively prevented. In a case in which the fluid BB is the foamy material, the pressure feeding mechanism 170 may simply send water, and the foamy material in undiluted form maybe disposed in the vicinity of the fluid discharger 122.

In the present embodiment, remote operation is made from one transmitter to a plurality of fluid dischargers 122. Therefore, the number of operators of the fluid dischargers 122 can be minimized and the plurality of fluid dischargers 122 can be used efficiently. Not limited to this, a single transmitter may be used to operate a single fluid discharger.

Therefore, according to the present embodiment, the fluid BB can be accurately discharged from the fluid discharger 122 to the predetermined work area 102, while further reducing power consumption.

Although the present invention has been described by taking the first embodiment as an example, the present invention is not limited to the first embodiment. In other words, it is needless to say that improvements and design changes can be made to the extent not deviating from the gist of the present invention.

For example, in the first embodiment, the second rotation mechanism 153 is provided with the first external gear 154, the second external gear 156, and the fixed gear 158, but the present invention is not limited to this. For example, it may be as in a second embodiment illustrated in FIGS. 5A to 7C. In the second embodiment, a support shaft 226A is provided with a second lever 253D, and a second rotation mechanism 253 is provided with a second connection part 253A that connects a second movable part 252D and the second lever 253D. In the second embodiment, since only a fluid discharger 222 is different, the first digit of the reference numerals is changed and explanation about components other than the fluid discharger 222 is omitted.

Figure 6A:
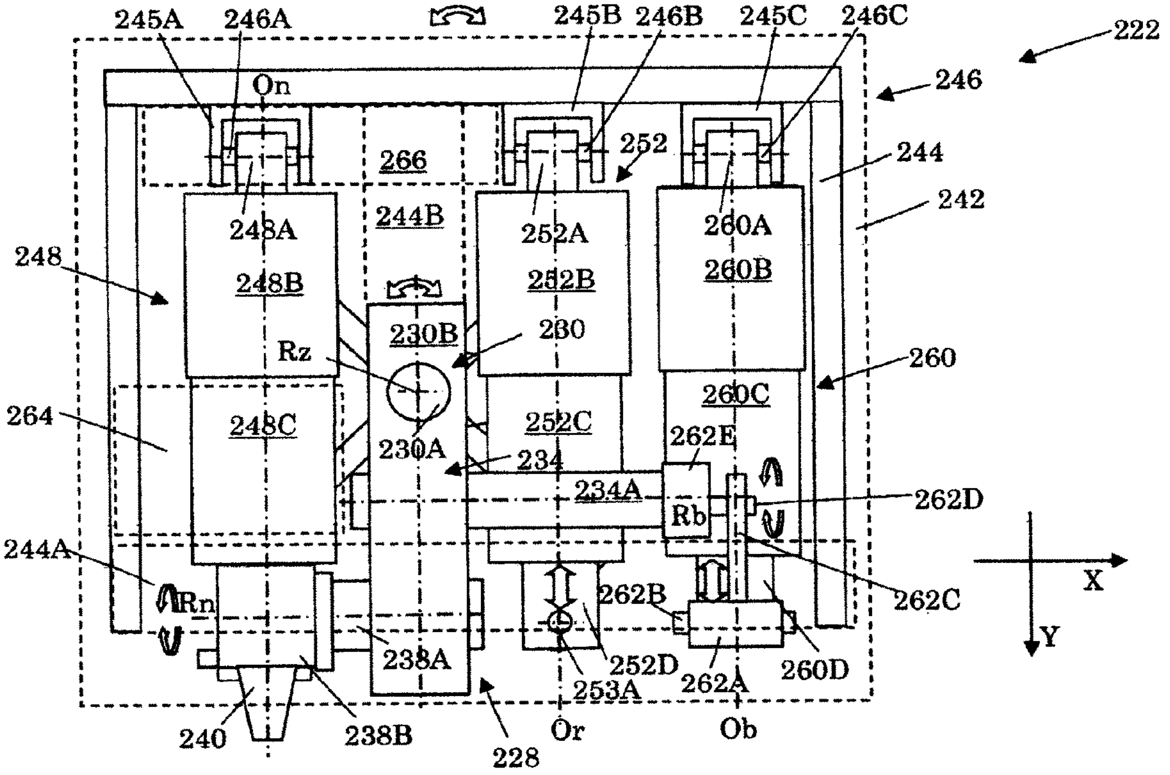
FIG. 6A is a top view of the fluid discharger in FIG. 5A in which a casing and the like are made transparent.
Figure 6B:
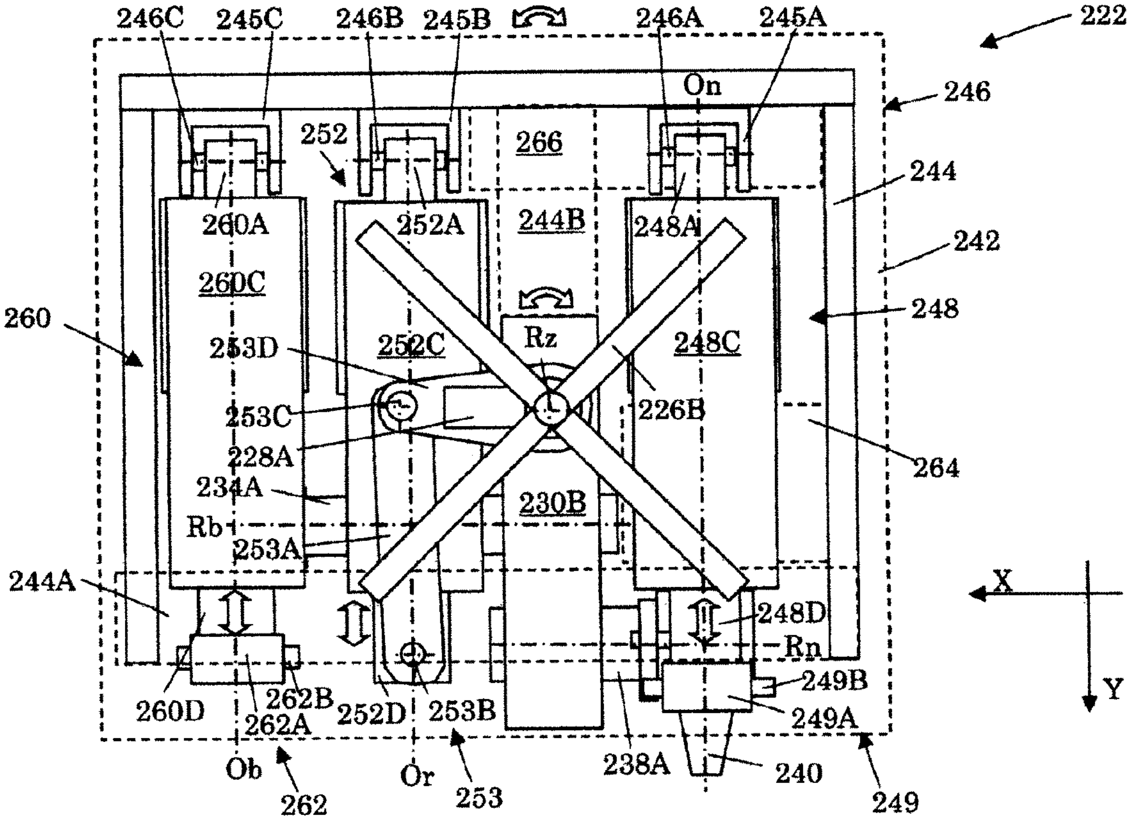
FIG. 6B is a bottom view of FIG. 6A in which the casing and the like are made transparent.

In the present embodiment, as illustrated in FIGS. 6A and 6B, the fluid discharger 222 includes a flow channel component 228, a support member 226, a rotation member 224, and a second rotation mechanism 253.

As illustrated in FIGS. 6A and 6B, the flow channel component 228 includes a fluid inlet port 228A, a second swivel joint structure 230, an open/close valve 234, a first swivel joint structure 238, and a discharge nozzle 240. The second swivel joint structure 230 includes a second fixed-side body 230A fixed to the support shaft 226A of the support member 226, and a second rotating-side body 230B fixed to the rotation member 224 and rotatable around the central axis (rotational axis Rz) of the second fixed-side body 230A. Here, the second rotating-side body 230B is rectangular parallelepiped in shape, and is integrated with a flow path connecting to the open/close valve 234, a flow path constituting the open/close valve 234, a flow path from the open/close valve 234 to the first swivel joint structure 238, and a first fixed-side body. The open/close valve 234 is, for example, a ball valve, and controls the amount of fluid BB to be discharged by rotating the open/close shaft 234A (around rotational axis Rb) (i.e., also in the present embodiment, the fluid discharger 222 is configured to include the second swivel joint structure 230 that has the second rotating-side body 230B, which is supported by the rotation member 224 and connected to the first swivel joint structure 238 to support the first swivel joint structure 238, and the second fixed-side body 230A, which is disposed on the support shaft 226A and rotatably supports the second rotating-side body 230B). The first swivel joint structure 238 includes the first fixed-side body integrated with the second rotating-side body 230B described above, and the first rotating-side body 238B rotatable around the central axis (rotational axis Rn) of the first fixed-side body. The discharge nozzle 240 is attached to the first rotating-side body 238B. Therefore, also in the present embodiment, the central axis (rotational axis Rz) of the support shaft 226A and the rotational axis Rn of the first swivel joint structure 238 are configured to be orthogonal to each other.

Figure 5A:
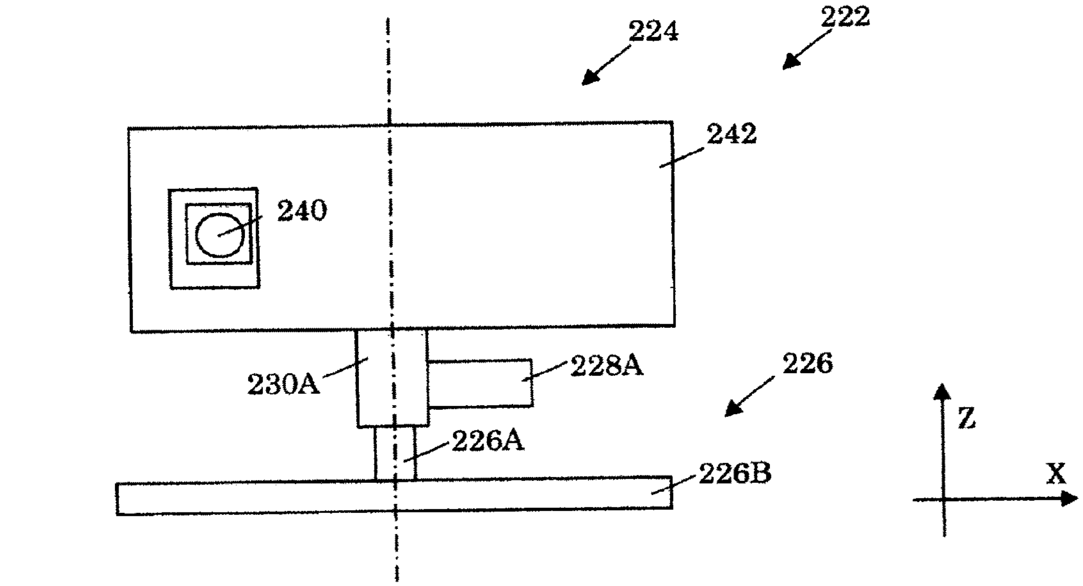
FIG. 5A is a front view of a fluid discharger according to a second embodiment of the present invention.
Figure 5B:
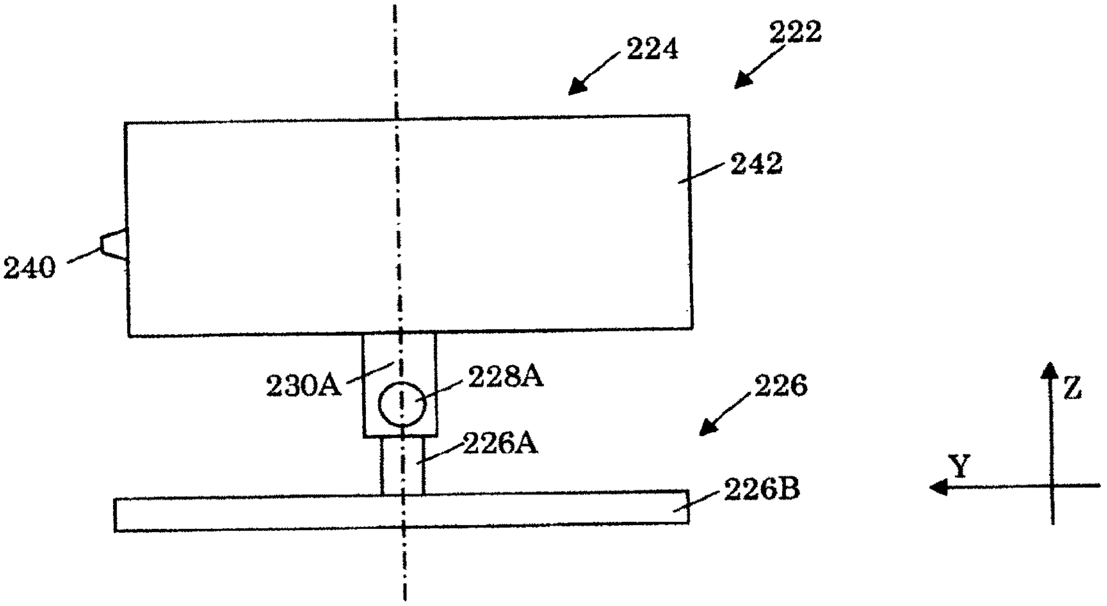
FIG. 5B is a side view of the fluid discharger in FIG. 5A.
Figure 5C:
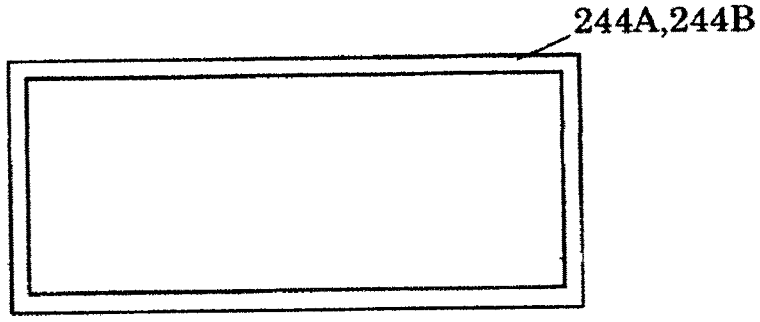
FIG. 5C is a diagram illustrating the shape of a frame illustrating a part of a frame body of the fluid discharger in FIG. 5A.

As illustrated in FIGS. 5A and 5B, the rotation member 224 is rotatable with respect to the support shaft 226A of the support member 226. A rectangular parallelepiped casing 242 is attached to the rotation member 224 as illustrated in FIGS. 5A and 5B (indicated by dashed lines in FIGS. 6A and 6B) (however, in contrast to a vertical shape, which is short in a Y direction and long in a Z direction, of the first embodiment, a horizontal shape is short in the Z direction and long in the X or Y direction). The rotation member 224 supports a frame body 244 made of plate steel in the shape of the letter U, and the discharge nozzle 240, a first electric linear motion mechanism 248, the first rotation mechanism 249, a second electric linear motion mechanism 252, a third electric linear motion mechanism 260, a third rotation mechanism 262, a control device 264, and a power supply 266 inside a frame-shaped frame body 244A (schematic shape is illustrated in FIG. 5C, and indicated by dashed lines in FIGS. 6A and 6B). As illustrated in FIGS. 6A and 6B, the second rotating-side body 230B is fixed to the frame body 244 via a frame-shaped frame body 244B (schematic shape is illustrated in FIG. 5C).

As illustrated in FIGS. 6A and 6B, the first, second, and third electric linear motion mechanisms 248, 252, and 260 include mount parts 248A, 252A, and 260A, motor parts

248B, 252B, and 260B, first, second, and third support parts 248C, 252C, and 260C, and first, second, and third movable parts 248D, 252D, and 260D, respectively. The mount parts 248A, 252A, and 260A have not-illustrated through holes, and are provided at ends of the first, second, and third support parts 248C, 252C, and 260C, respectively. The mount parts 248A, 252A, and 260A are supported by shaft fixing parts 245A, 245B, and 245C via support rods 246A, 246B, and 246C, respectively. The shaft fixing parts 245A, 245B, and 245C are fixed on the same flat plate that constitutes the frame body 244. That is, the end of the first support part 248C, the end of the second support part 252C, and the end of the third support part 260C are configured to be rotatably axially supported. Also, the first electric linear motion mechanism 248, the second electric linear motion mechanism 252, and the third electric linear motion mechanism 260 are configured to be disposed in the same direction in the rotation member 224.

Figure 7A:
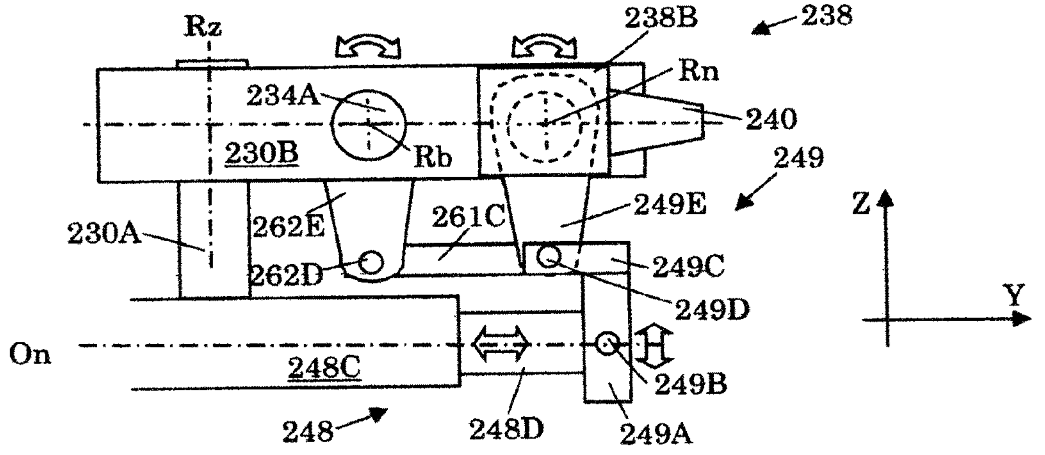
FIG. 7A is a side view illustrating a configuration around a discharge nozzle of the fluid discharger in FIG. 5A.

As illustrated in FIG. 7A, the first rotation mechanism 249 has a first connection part, in which a mount part 249A and an extension part 249C are integrated, between the first movable part 248D and a first lever 249E provided on a first rotating-side body 238B of the first swivel joint structure 238, and the first connection part is connected to the first movable part 248D and the first lever 249E by pins 249B and 249D, respectively. In other words, also in the present embodiment, the first lever 249E is provided on the first rotating-side body 238B, and the first rotation mechanism 249 is configured to include the first connection part connecting the first movable part 248D and the first lever 249E.

Figure 7B:
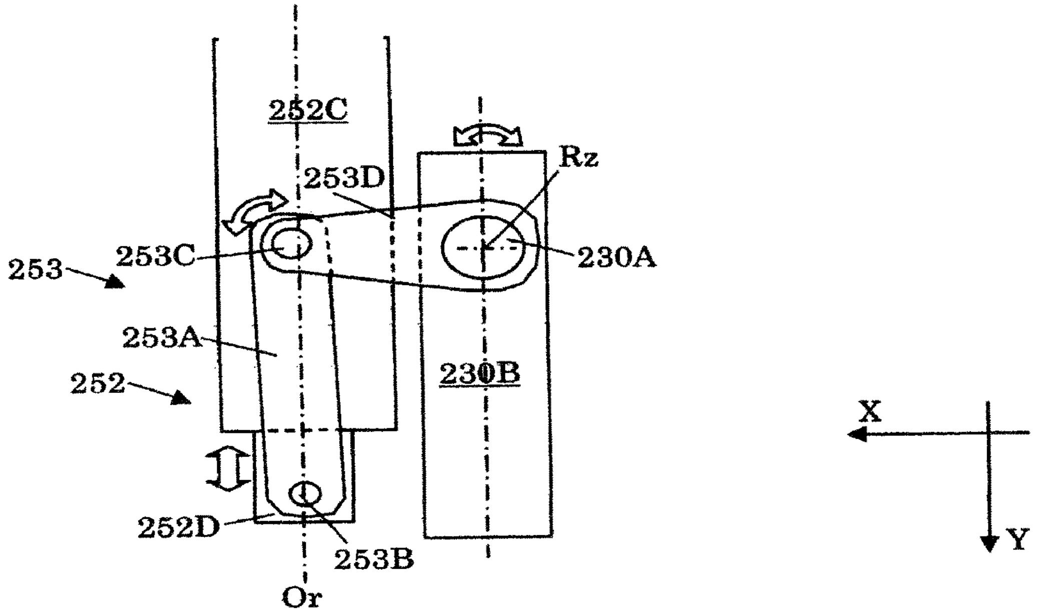
FIG. 7B is a bottom view illustrating a second rotation mechanism configured to rotate a rotation member of the fluid discharger in FIG. 5A.
Figure 7C:
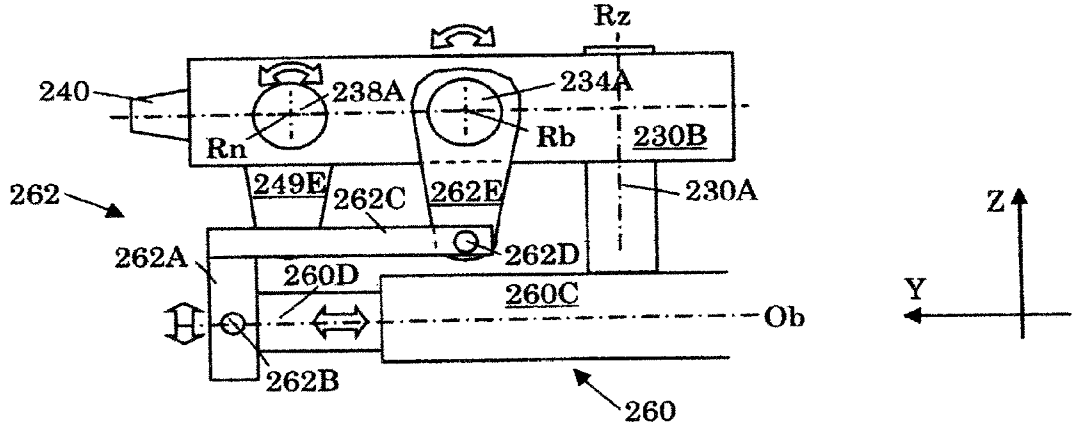
FIG. 7C is a side view illustrating a configuration around an open/close valve of the fluid discharger in FIG. 5A.

As illustrated in FIG. 7C, the third rotation mechanism 262 converts linear motion of the third movable part 260D into rotational motion to open and close the open/close valve 234 that regulates the amount of the fluid BB to be discharged from the discharge nozzle 240. Specifically, the third rotation mechanism 262 is provided with a third connection part, in which a mount part 262A and an extension part 262C are integrated, between the third movable part 260D and a third lever 262E provided on an open/close shaft 234A of the open/close valve 234, and the third connection part is connected to the third movable part 260D and the third lever 262E by pins 262B and 262D, respectively. That is, also in the present embodiment, the third lever 262E is provided on the open/close shaft 234A of the open/close valve 234, and the third rotation mechanism 262 is configured to include the third connection part connecting the third movable part 260D and the third lever 262E.

As illustrated in FIGS. 6B and 7B, the second rotation mechanism 253 is provided with the second connection part 253A and the second lever 253D. The second connection part 253A is located between the second movable part 252D and the second lever 253D, and is connected to the second movable part 252D and the second lever 253D by pins 253B and 253C, respectively. The second lever 253D is provided on the second fixed-side body 230A that is fixed to the support shaft 226A. That is, the second rotation mechanism 253 is configured to convert linear motion of the second movable part 252D into rotational motion to rotationally move the rotation member 224, to which the second support part 252C is fixed, with respect to the support member 226.

Therefore, in the present embodiment, the second rotation mechanism 253 can be made with a simple configuration, which enables downsizing and cost reduction.

Also, in the present embodiment, the first, second, and third electric linear motion mechanisms 248, 252, and 260 are aligned horizontally, and the rotation member 224 is short in the Z direction and long in the X or Y direction. This allows the center of gravity of the fluid discharger 222 to be lower than that of the first embodiment, and further prevents falling over. Also, a solar cell or the like may be set on an upper surface of the rotation member 224 to serve as a generator for the fluid discharger 222 and to charge the power supply 266.

In the second embodiment, the support shaft 226A is provided with the second lever 253D, and the second rotation mechanism 253 is provided with the second connection part 253A connecting the second movable part 252D and the second lever 253D, but the present invention is not limited to this. For example, it may be as in a third embodiment illustrated in FIGS. 8A to 11C. The third embodiment has a horizontal shape (FIGS. 8A and 8B) that is long in an XY direction, just as in the case of the fluid discharger 222 of the second embodiment, and substantially, only a second rotation mechanism 353 is different from the second rotation mechanisms 153 and 253 of the first and second embodiments, so the first digit of the reference numerals is changed and explanation of components other than the second rotation mechanism 353 is omitted as much as possible.

In the present embodiment, as illustrated in FIGS. 8A, 8B, 9A, and 9B, the fluid discharger 322 has a flow channel component 328, a support member 326, a rotation member 324, and a second rotation mechanism 353.

Figure 9A:
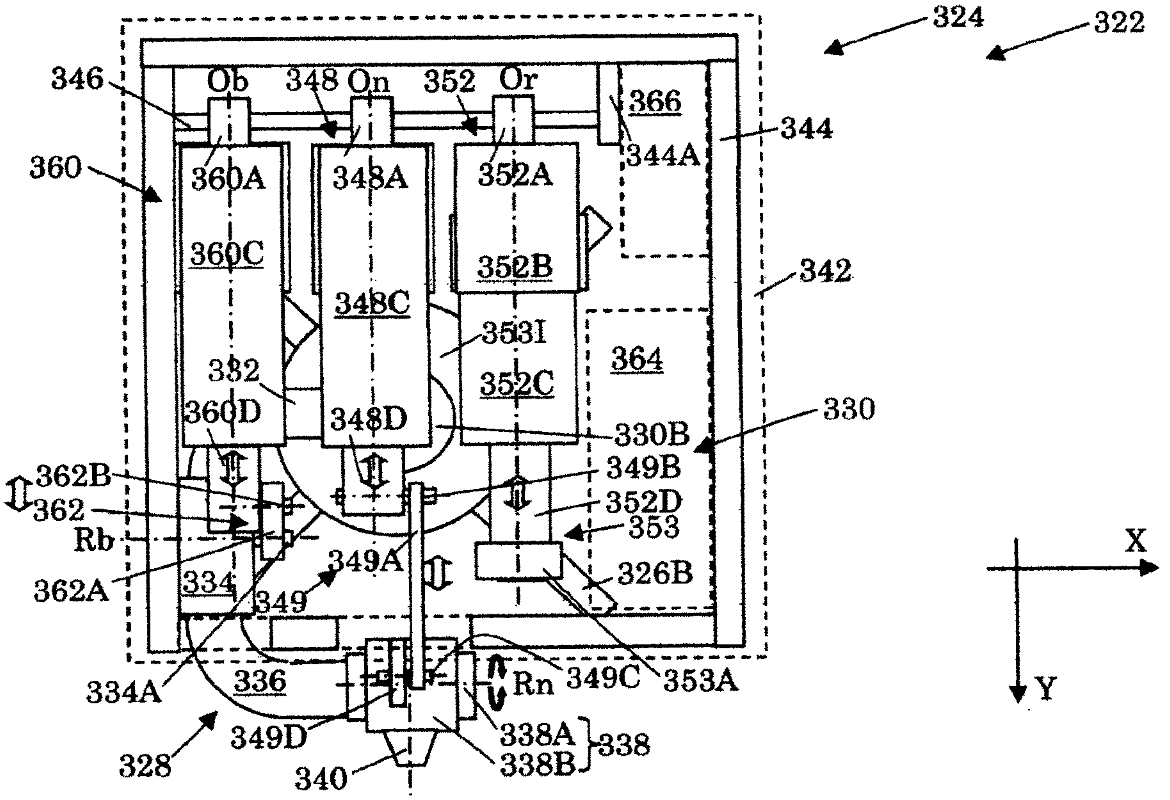
FIG. 9A is a top view of the fluid discharger in FIG. 8A in which a casing and the like are made transparent.
Figure 9B:
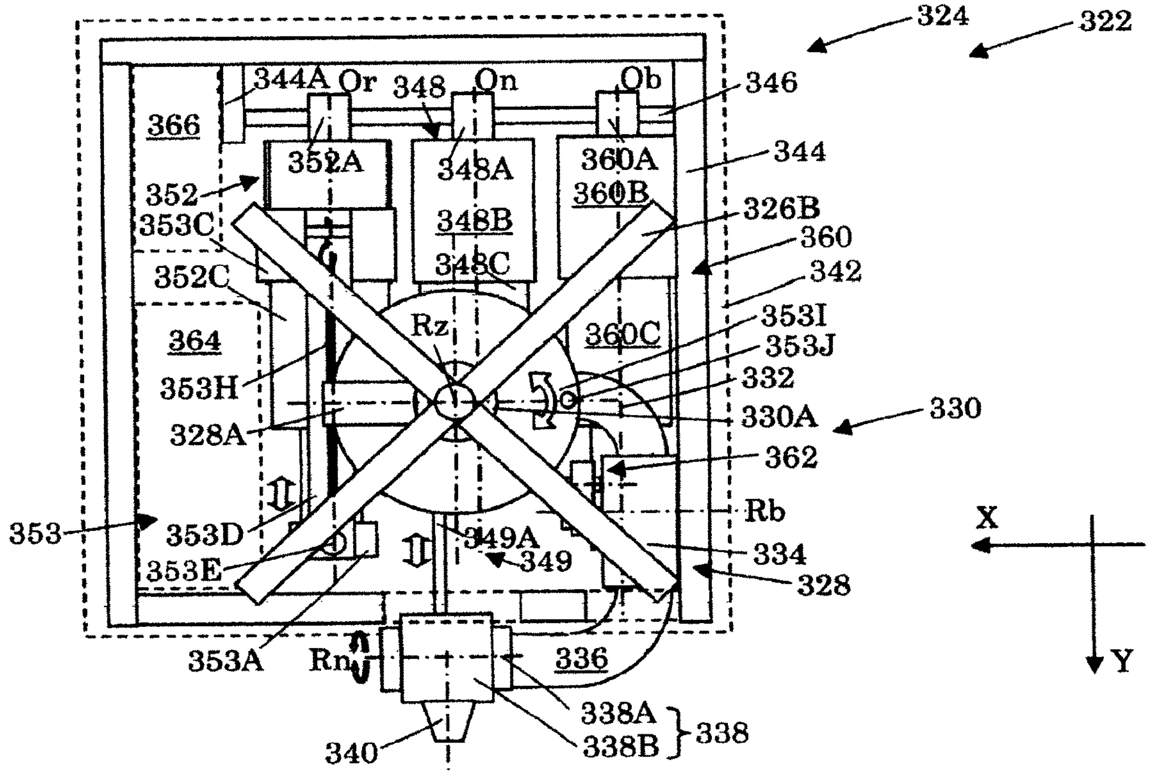
FIG. 9B is a bottom view of FIG. 9A in which the casing and the like of FIG. 9A are made transparent.

The flow channel component 328 has the same configuration as the flow channel component 128 according to the first embodiment (may have the same configuration as the flow channel component 228 according to the second embodiment). In other words, as illustrated in FIGS. 9A and 9B, the flow channel component 328 includes a fluid inlet port 328A, a second swivel joint structure 330, L-shaped pipes 332 and 336, an open/close valve 334, a first swivel joint structure 338, and a discharge nozzle 340. The second swivel joint structure 330 includes a second fixed-side body 330A fixed to a support shaft 326A of the support member 326, and a second rotating-side body 330B fixed to the rotation member 324 and rotatable around the central axis (rotational axis Rz) of the second fixed-side body 330A. The L-shaped pipe 332 is connected to the second rotating-side body 330B and the open/close valve 334. The open/close valve 334 is, for example, a ball valve, and controls the amount of fluid BB to be discharged by rotating an open/close shaft 334A (around a rotational axis Rb). The L-shaped pipe 336 is connected to the open/close valve 334 and the first swivel joint structure 338. The first swivel joint structure 338 includes a first fixed-side body 338A connected to the L-shaped pipe 336, and a first rotating-side body 338B rotatable around the central axis (rotational axis Rn) of the first fixed-side body 338A. The discharge nozzle 340 is attached to the first rotating-side body 338B. Therefore, the central axis (rotational axis Rz) of the support shaft 326A and the rotational axis Rn of the first swivel joint structure 338 are configured to be orthogonal to each other.

Figure 8A:
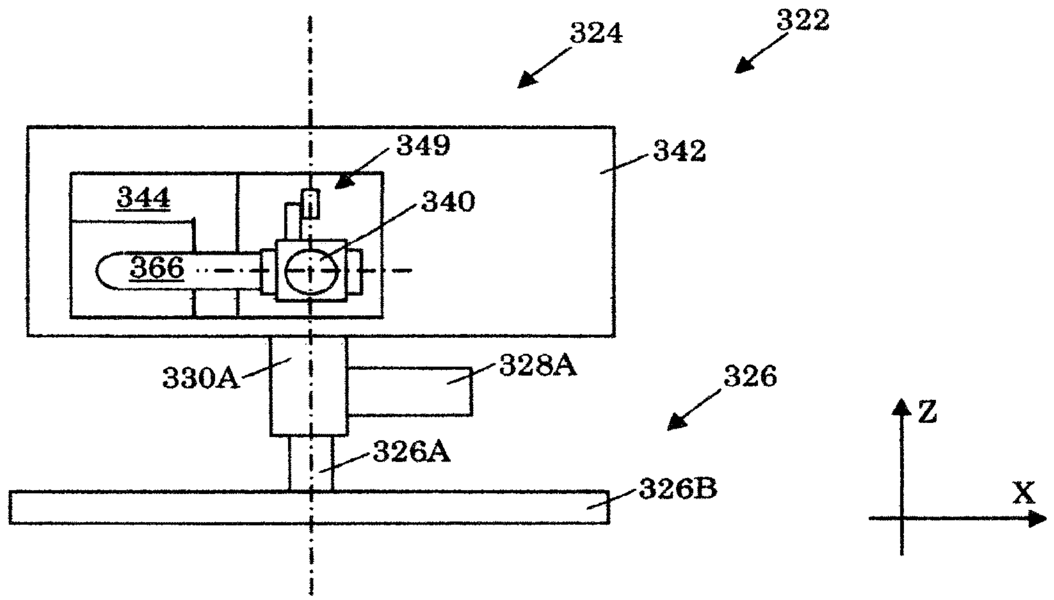
FIG. 8A is a front view of a fluid discharger according to a third embodiment of the present invention.
Figure 8B:
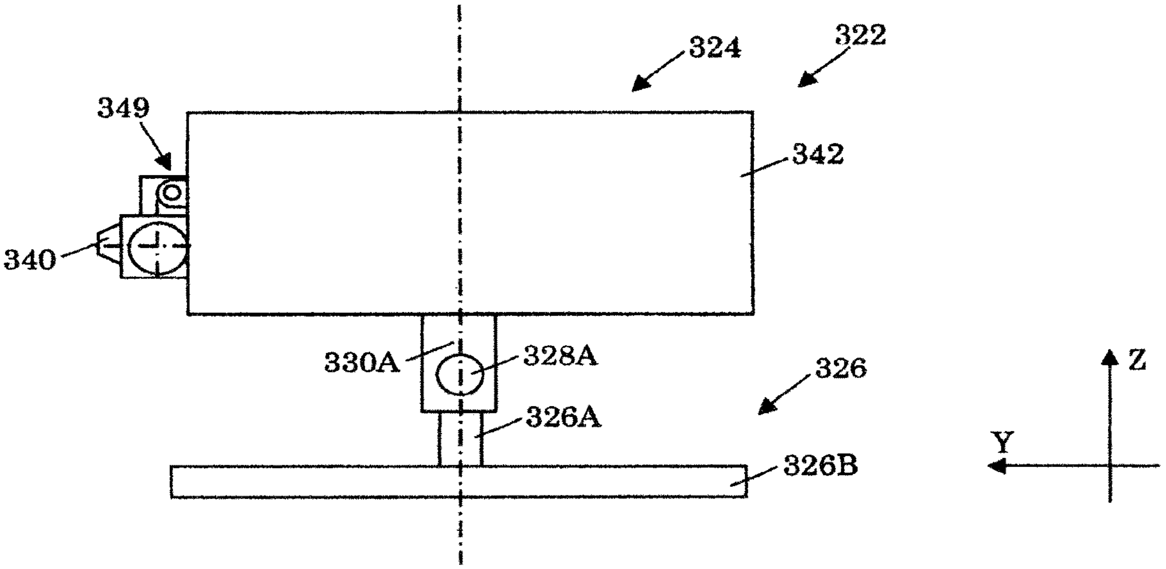
FIG. 8B is a side view of the fluid discharger in FIG. 8A.

As illustrated in FIGS. 8A and 8B, the rotation member 324 is rotatable with respect to the support shaft 326A of the support member 326. As illustrated in FIGS. 8A and 8B (indicated by dashed lines in FIGS. 9A and 9B), a rectangular parallelepiped casing 342 is attached to the rotation member 324 (similar to the second embodiment, the rotation member 324 has a horizontal shape that is short in the Z direction and long in the X or Y direction). The rotation member 324 supports a first electric linear motion mechanism 348, a first rotation mechanism 349, a second electric linear motion mechanism 352, a third electric linear motion mechanism 360, a third rotation mechanism 362, a control device 364, and a power supply 366 inside a frame body 344 made of plate steel in a frame shape.

As illustrated in FIGS. 9A and 9B, the first, second, and third electric linear motion mechanisms 348, 352, and 360 include mount parts 348A, 352A, and 360A, motor parts 348B, 352B, and 360B, first, second, and third support parts 348C, 352C, and 360C, and first, second, and third movable parts 348D, 352D, and 360D, respectively. The mount parts 348A, 352A, and 360A are supported by the frame body 344 via a support rod 346 and a holder part 344A. That is, an end of the first support part 348C, an end of the second support part 352C, and an end of the third support part 360C are configured to be rotatably axially supported. Also, the first electric linear motion mechanism 348, the second electric linear motion mechanism 352, and the third electric linear motion mechanism 360 are configured to be disposed in the same direction in the rotation member 324. However, since only the second electric linear motion mechanism 352 effectively positions and drives the second rotation mechanism 353, the positional relationship of the motor part 352B and the second support part 352C in the Z direction is opposite from that of the first electric linear motion mechanism 348 and the third electric linear motion mechanism 360 (such a positional relationship does not necessarily have to be maintained).

Figure 10A:
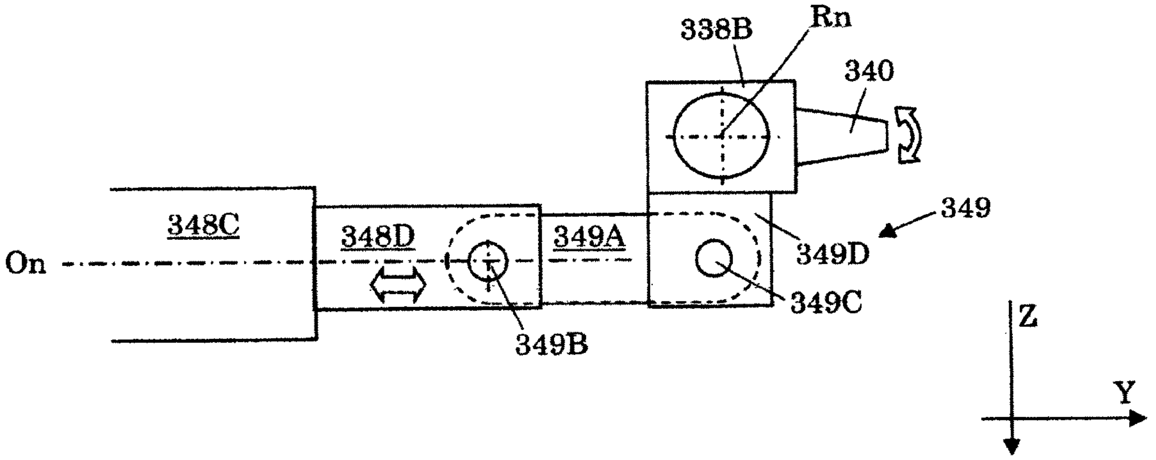
FIG. 10A is a side view illustrating a configuration around a discharge nozzle of the fluid discharger in FIG. 8A.

As illustrated in FIG. 10A, the first rotation mechanism 349 is provided with a plate-shaped first connection part 349A between the first movable part 348D and a first lever 349D provided on the first rotating-side body 338B of the first swivel joint structure 338, and the first connection part 349A is connected to the first movable part 348D and the first lever 349D by pins 349B and 349C, respectively. The differences from the first rotation mechanism 149 according to the first embodiment are as follows. The angular relationship between the discharge nozzle 340 and the first lever 349D is 90 degrees, instead of 180 degrees. The first connection part 349A is connected to the first lever 349D in the form of being extended, instead of being folded back to a root side of the first movable part 348D.

Figure 10B:
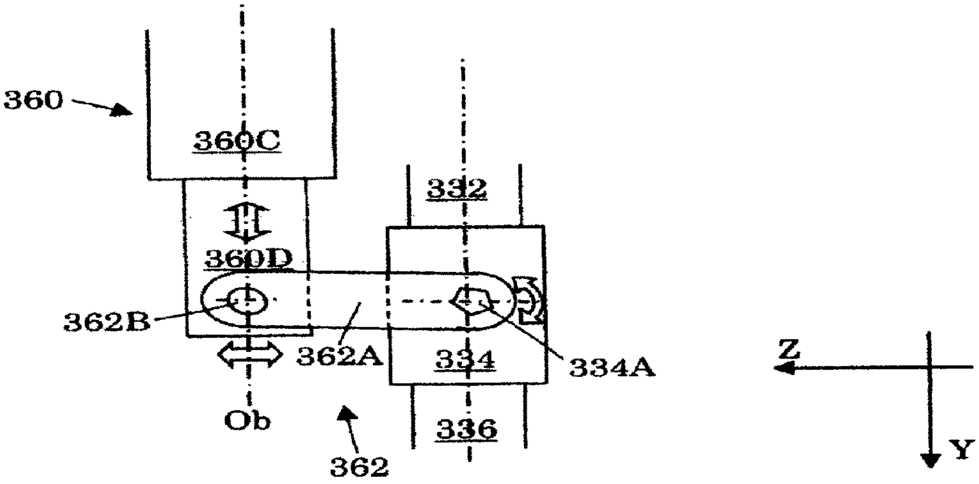
FIG. 10B is a side view illustrating a configuration around an open/close valve of the fluid discharger in FIG. 10A.

As illustrated in FIGS. 10B, the third rotation mechanism 362 converts linear motion of the third movable part 360D into rotational motion to open and close the open/close valve 334 to regulate the amount of fluid BB to be discharged from the discharge nozzle 340.

Specifically, as with the first embodiment, the third rotation mechanism 362 is configured so that the third lever 362A provided on the open/close shaft 334A of the open/close valve 334 and the third movable part 360D are connected by a pin 362B. Therefore, by motion of the third movable part 360D, a movement axis Ob swingingly rotates around the support rod 346.

Figure 11A:
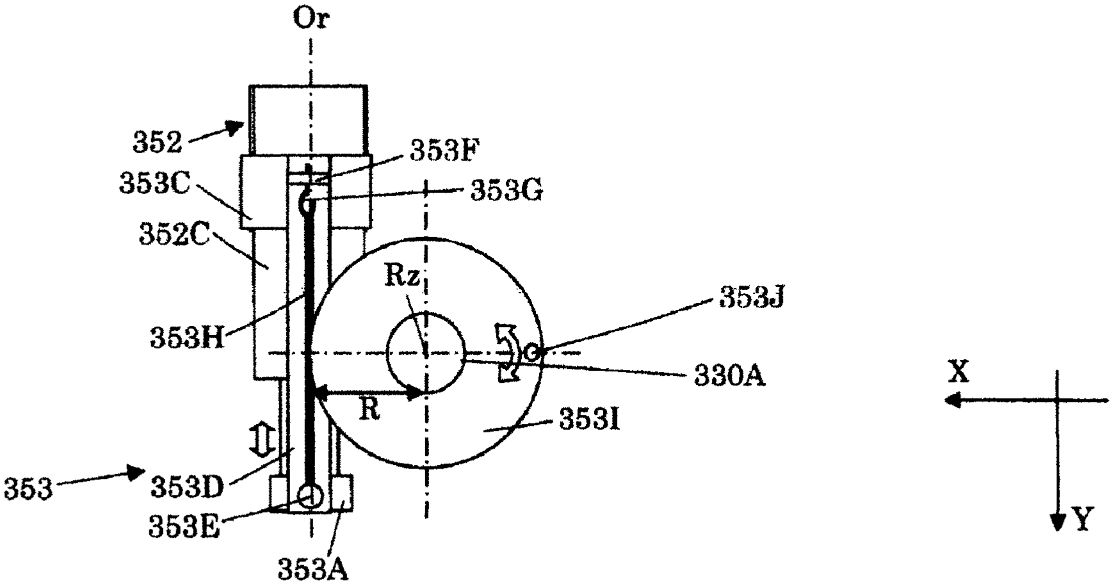
FIG. 11A is a bottom view illustrating a second rotation mechanism configured to rotate a rotation member of the fluid discharger in FIG. 8A.
Figure 11B:
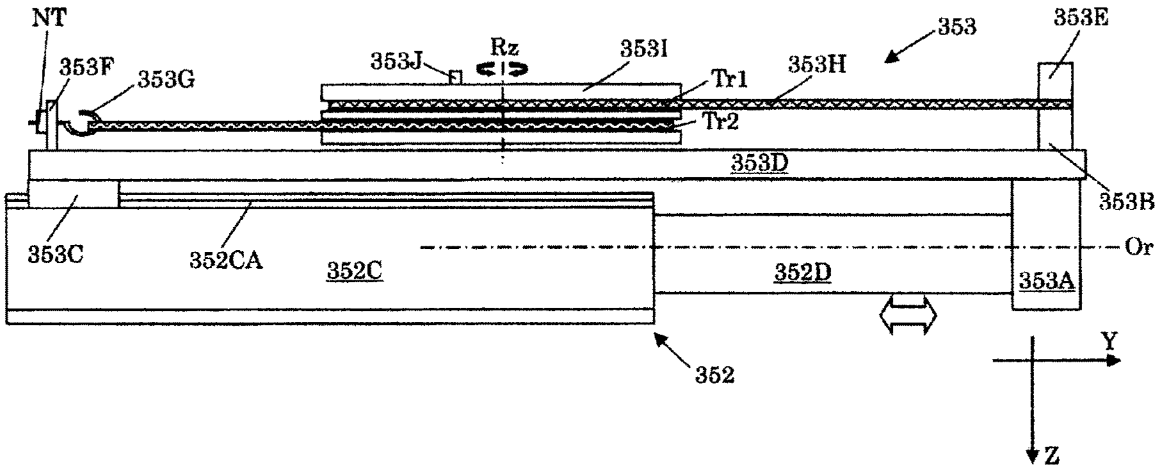
FIG. 11B is a side view illustrating the second rotation mechanism configured to rotate the rotation member in FIG. 11A.
Figure 11C:
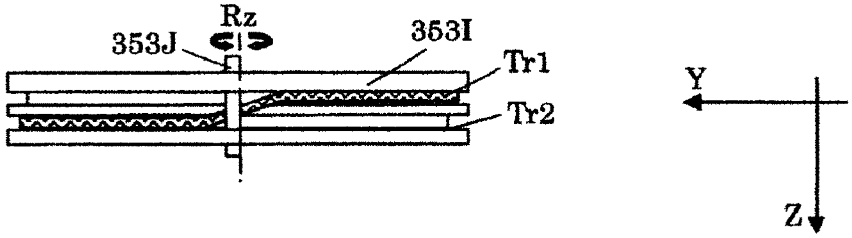
FIG. 11C is a side view illustrating the relationship between a pulley and a wire of the second rotation mechanism in FIG. 11A.

As illustrated in FIGS. 11A and 11B, the second rotation mechanism 353 is provided with a base member 353D, a metal wire (string-like member: it may be a resin or metal chain or a belt) 353H, and a pulley 353I. The base member 353D is a plate-like member that is longer than the second movable part 352D in the direction of the movement axis Or. One end of the base member 353D is attached to the second movable part 352D via a mount part 353A. The mount part 353A is attached to the second movable part 352D by a pin 353B.

The other end of the base member 353D is movably supported by a side surface 352CA of the second support part 352C via a slider part 353C fixed to a lower surface of the base member 353D. A surface of the slider part 353C that is in contact with the side surface 352CA is shaped in accordance with the side surface 352CA to be engaged with the side surface 352CA. As a result, the direction and motion of the base member 353D can be stabilized (not limited to this, the slider part 353C may be omitted).

As illustrated in FIG. 11B, a retaining part 353E to which one end of the wire 353H is attached is attached to the position of the pin 353B on an upper surface of the base member 353D. The other end of the wire 353H is attached via a hook 353G to a stop part 353F provided on other end of the base member 353D. One end of the hook 353G is in the shape of the letter U to allow the wire 353H to be suspended, and the other end is a spiral to which a nut NT can be screwed. Therefore, the movement axis Or of the second movable part 352D coincides with the direction of a straight line connecting the hook 353G and the retaining part 353E. By screwing the nut NT from outside the stop part 353F onto the screw of the hook 353G, the tension of the wire 353H disposed between the retaining part 353E and the hook 353G via the pulley 353I can be flexibly adjusted. That is, the wire 353H is held at a predetermined tension along the movement axis Or of the second movable part 352D on the base member 353D. Here, the predetermined tension means a tension at which the pulley 353I can be relatively rotated (the rotation member 324 is rotated relative to the support member 326) without slack in the wire 353H.

Here, as illustrated in FIG. 11A, the pulley 353I is fixed to the second fixed-side body 330A of the second swivel joint structure 330. The pulley 353I is in the shape of a disk with a radius R and has two grooves Tr1 and Tr2 on the entire outer circumference (FIGS. 11B and 11C; however, the grooves Tr1 and Tr2 become one at one point at which a stop part 353J is provided). By engaging and disengaging the wire 353H in each of the two grooves Tr1 and Tr2, the wire 353H is prevented from catching each other, and relative rotation of the pulley 353I is smoothly realized. In other words, the pulley 353I has the grooves Tr1 and Tr2 provided on its outer circumference engaged with the wire 353H, and is fixed to the support shaft 326A. The wire 353H is arranged around the entire circumferences of the grooves Tr1 and Tr2 and is in the form of crossing.

As illustrated in FIG. 11A, the positional relationship between the pulley 353I and the base member 353D (i.e., the second electric linear motion mechanism 352) is designed such that a straight line connecting the retaining part 353E and the hook 353G is tangent to the pulley 353I. Therefore, the required length of the wire 353H can be minimized, and unintentional slack of the wire 353H can be prevented.

Therefore, in the present embodiment, a rotational torque of the rotation member 324 by the second rotation mechanism 353 can be made constant, and the rotational amount of the rotation member 324 that can be realized by the second rotation mechanism 353 can be increased. In the present embodiment, the wire 353H has one winding on the pulley 353I, but the greater the number of windings (the longer the distance over which the wire 353H and the pulley 353I are engaged), the greater the amount of rotation of the rotation member 324 can be.

Also, in the present embodiment, the wire 353H is arranged around the entire circumferences of the grooves Tr1 and Tr2 and is in the form of crossing. That is, the wire 353H is wound around the entire circumference of the pulley 353I, and further, the wire 353H is fixed to the pulley 353I at the stop part 353J. Therefore, the pulley 353I can be relatively rotated more reliably by moving the base member 353D. Not limited to this, the wire maybe engaged only in part of the grooves Tr1 and Tr2, or the wire may not be fixed to the pulley at the stop part.

The configuration of the second rotation mechanism 353 according to the present embodiment may be applied to the first rotation mechanism and the third rotation mechanism.

In the above-described embodiment, the fluid discharger is disposed on scaffolding and the pressure feeding mechanism is disposed on the ground, but the present invention is not limited to this. For example, the fluid discharger may simply be disposed on an object to be worked on (including the ground), or the pressure feeding mechanism may be disposed in the same position as the fluid discharger next to each other.

In the above-described embodiments, the so-called "crusher" is described as an example as a work machine, but the application of the present invention is not limited to this. For example, the same effect can be obtained by applying the invention to a pile driver, a pile extractor, a bulldozer, a tractor excavator, a power shovel, a backhoe, a dragline, a clamshell, a crawler drill, an earth drill, a crane, a road cutter, a breaker, and the like. In short, the present invention can be widely applied to work machines that perform work that may generate dust in civil engineering work, construction work, or demolition work.

INDUSTRIAL APPLICABILITY

The present invention can be used at a site of work that generates dust, such as in civil engineering work, construction work, demolition work, or the like, and is particularly suitably used in demolition work, repair work, or the like of a solid structure.

REFERENCE SIGNS LIST

100 work site
102 work area
104 building (object to be worked on)
106 scaffolding
108 curing sheet
110 work machine
112 cab
114 arm
116 work attachment
120 dust suppression system
122, 222, 322 fluid discharger
124, 224. 324 rotation member
126, 226, 326 support member
126A, 226A, 326A support shaft
126B, 226B, 326B base
128, 228, 328 flow channel component
128A, 228A, 328A fluid inlet port
130, 230, 330 second swivel joint structure
130A, 230A, 330A second fixed-side body
130B, 230B, 330B second rotating-side body
132, 136, 332, 336 L-shaped pipe
134, 234, 334 open/close valve
134A, 234A, 334A open/close shaft
138, 238, 338 first swivel joint structure
138A, 338A first fixed-side body
138B, 238B, 338B first rotating-side body
140, 240, 340 discharge nozzle
142, 242, 342 casing
144, 244, 244A, 244B, 344 frame body
144A holder part
146, 246A, 246B, 246C, 346 support rod
148, 248, 348 first electric linear motion mechanism
148A, 152A, 154A, 160A, 248A, 249A, 252A, 260A, 262A, 348A,
352A, 360A, 353A mount part
148B, 152B, 160B, 248B, 252B, 260B, 348B, 352B, 360B
motor part
148C, 248C, 348C first support part
148D, 248D, 348D first movable part
149, 249, 349 first rotation mechanism
149A, 349A first connection part
149B, 149C, 162B, 249B, 249D, 253B, 253C, 262B, 262D, 349B,
349C, 353B, 362B pin
149D, 249E, 349D first lever
152, 252, 352 second electric linear motion mechanism
152C, 252C, 352C second support part
152D, 252D, 352D second movable part
153, 253, 353 second rotation mechanism
154 first external gear
156 second external gear
156B opening shape
156BA, 156BB inner surface
158 fixed gear
160, 260, 360 third electric linear motion mechanism
160C, 260C, 360C third support part
160D, 260D, 360D third movable part
162, 262, 362 third rotation mechanism
162A, 262E, 362A third lever
164, 264, 364 control device
166, 266, 366 power supply
170 pressure feeding mechanism
170A pump
170B tank
249C, 262C extension part
245A, 245B, 245C shaft fixing part
253A second connection part
253D second lever
344A, 353E holder part
352CA side surface
353C slider part
353D base member
353F, 353J stop part
353G hook
353H wire
353I pulley
BB fluid
NT nut
Ob, On, Or movement axis
Rb, Rn, Rz rotational axis
T1, T2 flexible pipe
Tr spiral trajectory
Tr1, Tr2 groove

The invention claimed is:

1. A dust suppression system comprising one or more fluid dischargers configured to discharge a fluid capable of suppressing generation of dust to a work area of an object to be worked by remote operation, wherein:

the one or more fluid dischargers includes a discharge nozzle configured to discharge the fluid, a first swivel joint structure including a first rotating-side body connected to and supporting the discharge nozzle and a first fixed-side body rotatably supporting the first rotating-side body, a first electric linear motion mechanism including a first support part and a first movable part supported by the first support part in a linearly movable manner, and a first rotation mechanism configured to convert linear motion of the first movable part into rotational motion to rotationally displace the first rotating-side body, and pressure fluctuation of the fluid is applied in a direction parallel to the rotational axis of the first rotating-side body, wherein:

the one or more fluid dischargers further includes a support member, a rotation member that supports the discharge nozzle, the first electric linear motion mechanism, the first rotation mechanism, and a second electric linear motion mechanism including a second support part and a second movable part supported by the second support part in a linearly movable manner, the rotation member being rotatable with respect to a support shaft of the support member, and a second rotation mechanism configured to convert linear motion of the second movable part into rotational motion to rotationally move the rotation member with respect to the support member; and the support shaft is orthogonal to a rotational axis of the first swivel joint structure.

2. The dust suppression system according to claim 1, wherein:

the first rotating-side body is provided with a first lever; and the first rotation mechanism includes a first connection part that connects the first movable part and the first lever.

3. The dust suppression system according to claim 1, wherein the second rotation mechanism includes a first external gear that is provided at an end of the second movable part and has a spiral shape along a movement direction of the second movable part; and a second external gear that has an opening shape on its central axis that engages with the first external gear, rotates with linear motion of the first external gear, and engages with a fixed gear fixed to the support shaft.

4. The dust suppression system according to claim 1, wherein:

the support shaft is provided with a second lever; and the second rotation mechanism includes a second connection part that connects the second movable part and the second lever.

5. The dust suppression system according to claim 1, wherein the second rotation mechanism includes a base member attached to the second movable part, a string member held at a predetermined tension along a movement direction of the second movable part on the base member, and a pulley that has a groove provided on an outer circumference engaging with the string member and is fixed to the support shaft.

6. The dust suppression system according to claim 5, wherein the string member is arranged around an entire circumference of the groove and is in a form of crossing.

7. The dust suppression system according to claim 3, wherein the one or more fluid dischargers includes a second swivel joint structure that has a second rotating-side body supported by the rotation member and connected to and supporting the first swivel joint structure, and a second fixed-side body disposed on the support shaft and rotatably supporting the second rotating-side body.

8. The dust suppression system according to claim 1, wherein the one or more fluid dischargers further includes a third electric linear motion mechanism that has a third support part and a third movable part supported by the third support part in a linearly movable manner, and a third rotation mechanism configured to convert linear motion of the third movable part into rotational motion to open and close an open/close valve to regulate an amount of a fluid to be discharged from the discharge nozzle.

9. The dust suppression system according to claim 8, wherein:

an open/close shaft of the open/close valve is provided with a third lever; and the third rotation mechanism includes a third connection part configured to connect the third movable part and the third lever.

10. The dust suppression system according to claim 9, wherein the third electric linear motion mechanism, the third rotation mechanism, and the open/close valve are supported by the rotation member.

11. The dust suppression system according to claim 8, wherein an end of the first support part, an end of the second support part, and an end of the third support part are rotatably axially supported.

12. The dust suppression system according to claim 11, wherein the first electric linear motion mechanism, the second electric linear motion mechanism, and the third electric linear motion mechanism are disposed in a same direction in the rotation member.

13. The dust suppression system according to claim 1, wherein the fluid includes water or a foamy material.

14. The dust suppression system according to claim 1, wherein the remote operation is made from one transmitter to a plurality of the one or more fluid dischargers.

* * * * *